United States Patent
Nakano

(10) Patent No.: US 9,177,235 B2
(45) Date of Patent: Nov. 3, 2015

(54) IMAGE FORMING APPARATUS AND POWER SUPPLY CONTROL METHOD

(71) Applicant: Tomoaki Nakano, Kanagawa (JP)

(72) Inventor: Tomoaki Nakano, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/279,459

(22) Filed: May 16, 2014

(65) Prior Publication Data

US 2014/0340699 A1 Nov. 20, 2014

(30) Foreign Application Priority Data

May 20, 2013 (JP) .................. 2013-106605

(51) Int. Cl.
| | |
|---|---|
| *G06F 3/12* | (2006.01) |
| *G06K 15/00* | (2006.01) |
| *B41J 29/13* | (2006.01) |
| *B41J 29/38* | (2006.01) |
| *B41J 29/393* | (2006.01) |
| *H04N 1/00* | (2006.01) |

(52) U.S. Cl.
CPC ............ *G06K 15/4055* (2013.01); *B41J 29/13* (2013.01); *B41J 29/38* (2013.01); *B41J 29/393* (2013.01); *G06F 3/1221* (2013.01); *G06F 3/1229* (2013.01); *H04N 1/00896* (2013.01); *H04N 1/00899* (2013.01)

(58) Field of Classification Search
CPC .................................................. G06K 15/4055
See application file for complete search history.

(56) References Cited

FOREIGN PATENT DOCUMENTS

| JP | 2009-222824 | 10/2009 |
|---|---|---|
| JP | 2012-140003 | 7/2012 |

OTHER PUBLICATIONS

Machine (computer) translation of JP 2009-222824.pdf.*

* cited by examiner

*Primary Examiner* — Dov Popovici
(74) *Attorney, Agent, or Firm* — Oblon, McClelland, Maier & Neustadt, L.L.P.

(57) ABSTRACT

An image forming apparatus includes a power supply control unit that performs control of switching a power supply source to an auxiliary power supply that stores therein power from a main power supply when the main power supply is off, and control of switching the power supply source to the main power supply when the main power supply is on; a detection unit that detects whether the power supply source is the main power supply or the auxiliary power supply; and a mode control unit that performs control of switching between a normal mode and a power-saving mode in which power consumption is smaller than in the normal mode. The mode control unit performs control of setting a switching time to switch from the normal mode to the power-saving mode to a shorter time when the power supply source is the auxiliary power supply.

5 Claims, 13 Drawing Sheets

USING ONLY BATTERY (FROM BATTERY-IN TO POWER-ON)

USING ONLY MAIN POWER SUPPLY (FROM PLUG-IN TO POWER-ON)

| MAINTENANCE CONDITION | MAINTENANCE TYPE | |
|---|---|---|
| $Tk<(1/10)*Tk_0$ | A | NONE |
| $(1/10)*Tk_0<Tk<Tk_0$ | B | [(1) + (2) + (3)] * ONCE |
| $Tk_0<Tk<2*Tk_0$ | C | [(1) + (2) + (3)] * TWICE |
| $2*Tk_0<Tk$ | D | [(1) + (2) + (3)] * 3 TIMES |

IMAGE FORMING APPARATUS AND POWER SUPPLY CONTROL METHOD

CROSS-REFERENCE TO RELATED APPLICATION

The present application claims priority to and incorporates by reference the entire contents of Japanese Patent Application No. 2013-106605 filed in Japan on May 20, 2013.

BACKGROUND OF THE INVENTION

1. Field of the Invention

The present invention relates to an image forming apparatus and a power supply control method performed in the image forming apparatus.

2. Description of the Related Art

In recent years, image forming apparatuses such as printers have become common that can be driven not only by supply of power from a commercial power supply outside of an apparatus body via an AC adapter, but also by supply of power from a battery removably installed in the apparatus body.

To reduce power consumption as much as possible, the image forming apparatuses have a power-saving mode in which power supply is small until a print command is received while a print operation is stopped. A switching time is preset from when the print operation is finished in the normal mode allowing image formation until the mode changes to the power-saving mode, and a user can freely change the preset switching time.

In general, so as to prevent defective ejection of ink due to drying of nozzles, an inkjet printer performs maintenance operations for the nozzles after a print head has stood by for printing without being driven for a preset time or longer.

Japanese Laid-open Patent Publication No. 2009-222824 discloses a technology in which the mode is switchable between the power-saving mode and the normal mode, and a power source is supplied by using a secondary battery in accordance with the switched mode (operating state).

Japanese Laid-open Patent Publication No. 2012-140003 discloses a technology in which a head maintenance condition varies between when power is supplied from a commercial power supply and when an inkjet printer is driven by a battery, in order to extend the duration of the battery.

In an image forming apparatus disclosed in Japanese Laid-open Patent Publication No. 2009-222824 that can be driven by a battery, however, the switching time to the power-saving mode is set to the same value both while the image forming apparatus is driven by the commercial power supply and while the apparatus is driven by the battery. This causes a problem in that the user needs to manually reset the preset switching time to the power-saving mode to a shorter time so as to reduce the power consumption when the image forming apparatus is driven by the battery.

The inkjet printer disclosed in Japanese Laid-open Patent Publication No. 2012-140003 performs the maintenance operations for the nozzles when the inkjet printer is driven by the battery at the same frequency as when the printer is driven by the commercial power supply. This causes a problem in that the power consumption cannot be reduced when the inkjet printer is driven by the battery.

Therefore, there is a need to provide an image forming apparatus and a power supply control method that are capable of reducing the power consumption when the apparatus is driven by an auxiliary power supply.

SUMMARY OF THE INVENTION

It is an object of the present invention to at least partially solve the problems in the conventional technology.

According to an embodiment, there is provided an image forming apparatus that includes a main power supply; an auxiliary power supply that stores therein power from the main power supply, and supplies the stored power; a power supply control unit that performs control of switching a power supply source to the auxiliary power supply when the main power supply is off, and control of switching the power supply source to the main power supply when the main power supply is on; a detection unit that detects whether the power supply source is the main power supply or the auxiliary power supply; and a mode control unit that performs control of switching between a normal mode and a power-saving mode in which power consumption is smaller than in the normal mode. The mode control unit performs control of setting a switching time to switch from the normal mode to the power-saving mode to a shorter time when the detection unit detects that the power supply source is the auxiliary power supply.

According to another embodiment, there is provided a power supply control method performed in an image forming apparatus that includes a main power supply, and an auxiliary power supply that stores therein power from the main power supply, and supplies the stored power. The method includes performing power supply control of switching a power supply source to the auxiliary power supply when the main power supply is off, and of switching the power supply source to the main power supply when the main power supply is on; detecting whether the power supply source is the main power supply or the auxiliary power supply; and performing mode control of setting a switching time to switch from a normal mode to a power-saving mode in which power consumption is smaller than in the normal mode to a shorter time when it is detected that the power supply source is the auxiliary power supply, and of switching between the normal mode and the power-saving mode.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments of an image forming apparatus and a method of controlling a power supply according to the present invention will be described below in detail with reference to the accompanying drawings. While the embodiments will be described below by exemplifying an inkjet recording device as an example of the image forming apparatus, the present invention is not limited to this, but can be applied to any type of image forming apparatus. The present invention can be applied not only to the inkjet recording device, but also widely to the image forming apparatus that form images by ejecting ink droplets on a recording medium.

The inkjet recording device serving as the image forming apparatus according to the present embodiments has print heads that eject ink of four colors of K, C, M, and Y, and performs image recording by reciprocating the print heads in a direction orthogonal to a conveyance direction of recording paper.

First Embodiment

Figure 1:
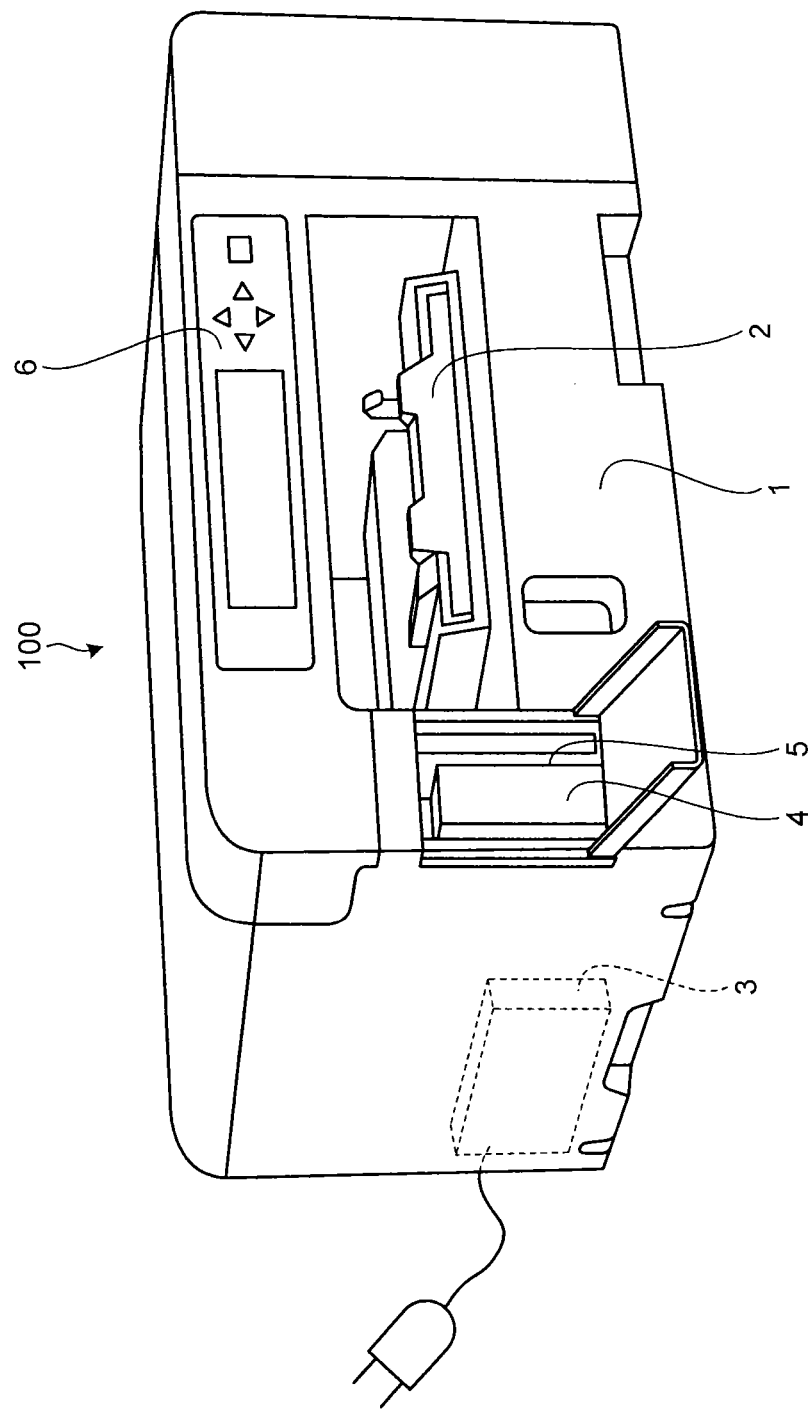
FIG. 1 is a perspective view illustrating an example of an external appearance of an image forming apparatus according to a first embodiment of the present invention.

FIG. 1 is a perspective view illustrating an example of an external appearance of the image forming apparatus according to a first embodiment of the present invention.

As illustrated in FIG. 1, this image forming apparatus 100 includes, in an apparatus body thereof, a paper feeding tray 1, a discharge tray 2, a main power supply 3, an auxiliary power supply 4, an auxiliary power supply loading unit 5, and an operation/display unit 6, as a main configuration.

The paper feeding tray 1 is provided to load sheets serving as the recording media loaded in the image forming apparatus 100. The sheets on which an image is recorded (formed) are accumulated in the discharge tray 2.

The main power supply 3 feeds power from a commercial power supply (AC power supply) to the image forming apparatus 100. The main power supply 3 converts an alternating-current voltage supplied from the commercial power supply into a direct-current voltage, and feeds the direct-current voltage to the image forming apparatus 100.

The auxiliary power supply (hereinafter also referred to as a battery) 4 is configured to be removable by a user by opening and closing a cover of the auxiliary power supply loading unit 5 provided on one end side of a front surface of the apparatus body. The auxiliary power supply 4 feeds power to the image forming apparatus 100 when no power is supplied from the commercial power supply. Having the auxiliary power supply 4 allows the image forming apparatus 100 to form images by being driven by the auxiliary power supply 4, for example, when the commercial power supply is unavailable in a use environment, or during a power outage. The auxiliary power supply 4 is configured to be usable not only for the image formation, but also for charging an information terminal apparatus such as a mobile phone.

The operation/display unit 6 is provided on an upper side of the front surface of the apparatus body, and has operation keys and a display screen arranged thereon. The display screen is provided with a touch panel, and various types of data can be entered from the operation keys and the touch panel.

Figure 2:
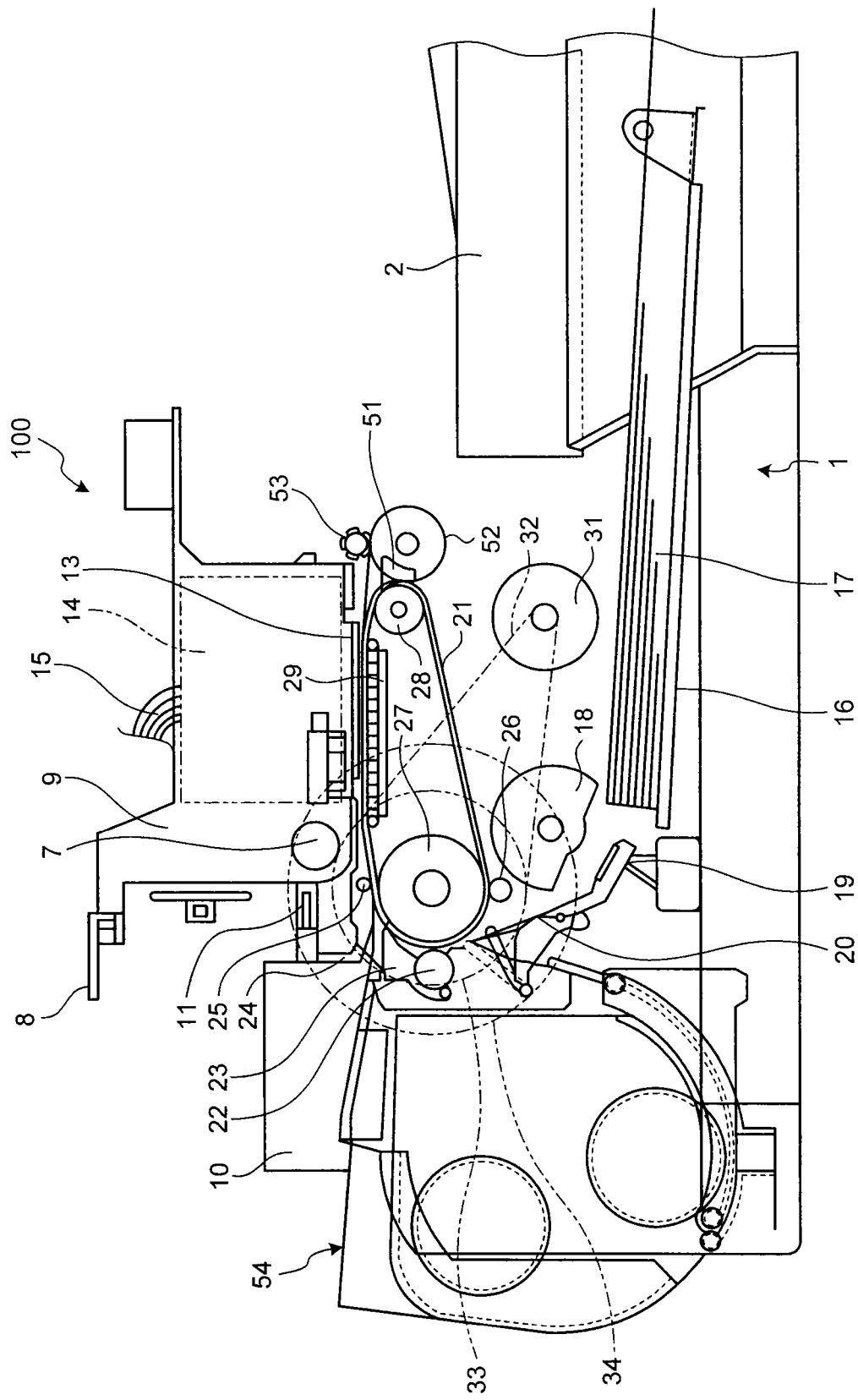
FIG. 2 is a side view illustrating an overall configuration of a mechanical part of the image forming apparatus according to the first embodiment.
Figure 3:
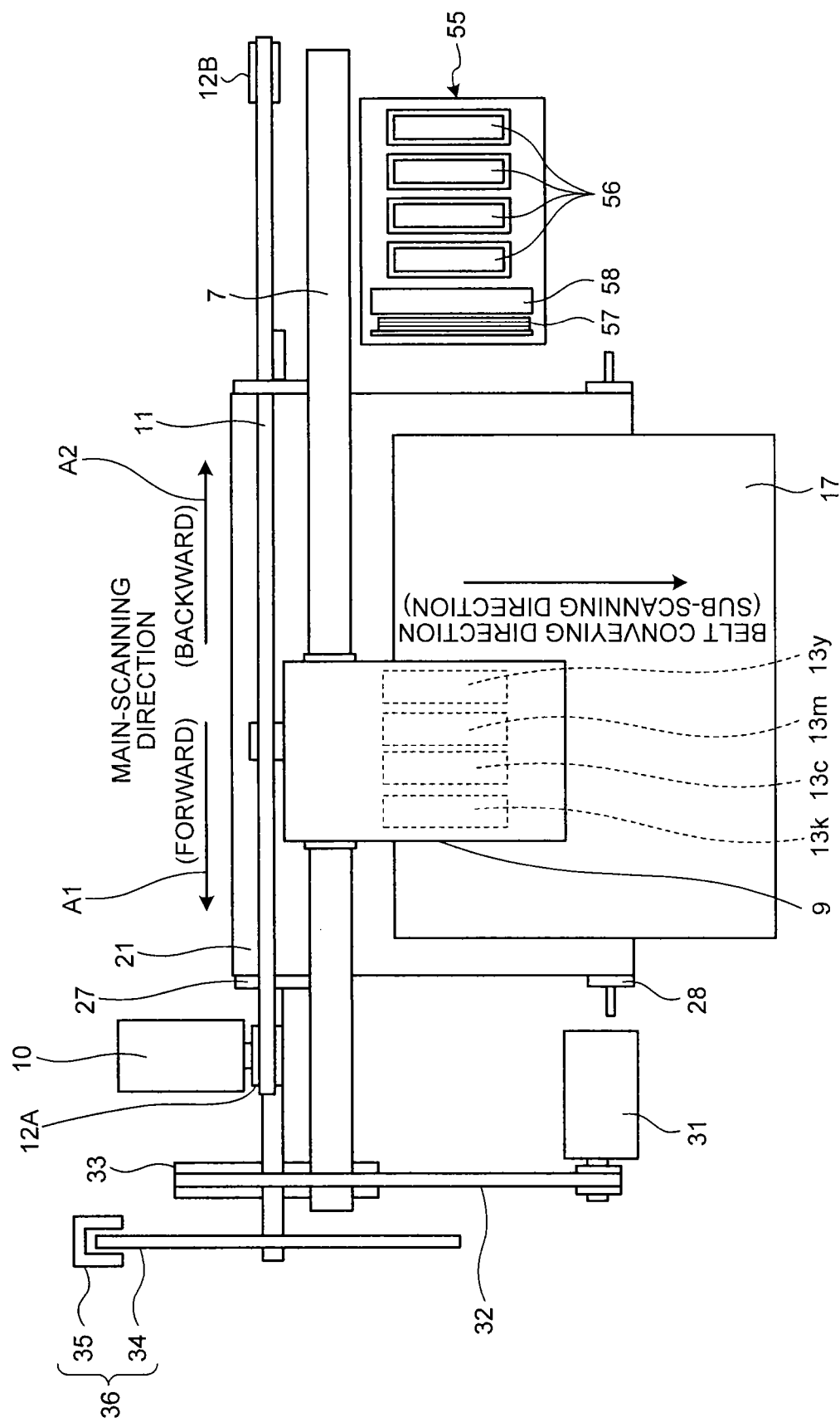
FIG. 3 is a plan view illustrating a configuration of the mechanical part of the image forming apparatus according to the first embodiment.

A configuration of a mechanical part of the image forming apparatus 100 will be described below. FIG. 2 is a side view illustrating an overall configuration of the mechanical part of the image forming apparatus according to the present embodiment. FIG. 3 is a plan view illustrating a configuration of the mechanical part of the image forming apparatus.

As illustrated in FIGS. 2 and 3, the image forming apparatus 100 includes a guide rod 7, a guide rail 8, a carriage 9, a main-scanning motor 10, a timing belt 11, a driving pulley 12A, and a driven pulley 12B. The carriage 9 is held so as to be slidable in the main-scanning direction along the guide rail 8 and the guide rod 7 that is a guide member horizontally laid between right and left side plates (not illustrated). The carriage 9 is moved by the main-scanning motor 10 via the timing belt 11 laid in a tensioned state between the driving pulley 12A and the driven pulley 12B for scanning in directions of arrows A1 and A2 (in the main-scanning direction) illustrated in FIG. 3.

The carriage 9 includes, for example, four print heads 13k, 13c, 13m, and 13y (hereinafter any of the print heads is referred to as a "print head 13") that have liquid ejection heads ejecting ink droplets of droplets of black (K), cyan (C), magenta (M), and yellow (Y), respectively. The print head 13 has a plurality of ink ejection ports each arranged directed in a direction intersecting the main-scanning direction and mounted so as to eject the ink droplets downward.

The liquid ejection heads constituting the print head 13 can each include a pressure generating unit that generates a pressure to eject the liquid droplets. Examples of the pressure generating unit include, but are not limited to, a piezoelectric actuator including, for example, a piezoelectric element, a thermal actuator including, for example, a heat generating resistor, a shape memory alloy actuator using a metal phase change by a temperature change, and an electrostatic actuator using an electrostatic force.

The print head is not limited to have the configuration of having the heads independent for the respective colors, but may have a configuration of having one or more liquid ejection heads that include a nozzle row composed of a plurality of nozzles for ejecting liquid droplets of a plurality of colors. The carriage 9 is equipped with sub-tanks 14 for the respective colors to feed the ink of the respective colors to the print head 13. The ink is replenished from main tanks (ink cartridges), which are not illustrated, via ink feed tubes 15.

The image forming apparatus 100 includes a semicircular roller (paper feeding roller) 18 and a separation pad 19, as a paper feeding unit for feeding sheets 17 loaded on a sheet loading unit (pressurizing plate) 16, such as the paper feeding tray (paper cassette) 1. The paper feeding roller 18 separates and feeds the sheets 17, sheet by sheet, from the sheet loading unit 16. The separation pad 19 is provided in a position facing the paper feeding roller 18, and is urged toward the paper feeding roller 18. The separation pad 19 is formed of a material having a large coefficient of friction.

The image forming apparatus 100 also includes a conveying belt 21, a counter roller 22, a conveyance guide 23, a pressing member 24, a pressing roller 25, and a roller charging device 26, as a conveying unit for conveying under the print head 13 each of the sheets 17 fed from the paper feeding unit. The conveying belt 21 conveys the sheet 17 by electrostatically attaching the sheet 17 to the conveying belt 21. The counter roller 22 sandwiches the sheet 17 fed from the paper feeding unit via a guide 20 between itself and the conveying belt 21, and conveys the sheet 17. The conveyance guide 23 changes the direction of the sheet 17 fed substantially vertically upward by approximately 90 degrees, and makes the sheet 17 follow a surface of the conveying belt 21. The pressing member 24 urges the pressing roller 25 toward the conveying belt 21, and presses the sheet 17 with the pressing roller 25. The roller charging device 26 charges the surface of the conveying belt 21.

The conveying belt 21 is an endless belt, and is wound between a carriage roller 27 and a tension roller 28. The conveying belt 21 is configured to circulate in the belt conveyance direction (sub-scanning direction) in FIG. 3 as a sub-scanning motor 31 rotates the carriage roller 27 via a timing belt 32 and a timing roller 33. A guide member 29 is placed on the back surface of the conveying belt 21 corresponding to an area for image formation by the print head 13.

The upper surface of the guide member 29 protrudes toward the print head 13 from a tangent line of the two rollers (the carriage roller 27 and the tension roller 28) supporting the conveying belt 21. This causes the conveying belt 21 to be pushed up and guided over the upper surface of the guide member 29 in the area for image formation so as to maintain accurate flatness of the conveying belt 21.

Furthermore, a plurality of grooves are formed in the main-scanning direction, that is, in the direction orthogonal to the conveyance direction, on a surface of the guide member 29 contacting the back surface of the conveying belt 21 so as to reduce a contact area of the guide member 29 with the conveying belt 21 and to allow the conveying belt 21 to smoothly move along the surface of the guide member 29.

The roller charging device 26 is placed so as to contact a surface layer of the conveying belt 21, and so as to rotate driven by the circular movement of the conveying belt 21. A pressing force of 2.5 N for the conveying belt 21 is applied to each end of a shaft of the roller charging device 26.

As illustrated in FIG. 3, a rotary encoder 36 includes a slit disc 34 and a sensor 35. The slit disc 34 is mounted on a shaft of the carriage roller 27, and provided with the sensor 35 that detects slits of the slit disc 34.

The image forming apparatus 100 further includes a separation claw 51, a discharging roller 52, a discharging roller 53, and the discharge tray 2, as a discharging unit for discharging the sheet 17 on which recording has been made by the print head 13. The separation claw 51 separates the sheet 17 from the conveying belt 21. The discharging rollers 52 and 53 sandwich the sheet 17 therebetween and discharge it. The discharge tray 2 accumulates the sheets 17 discharged below the discharging roller 52. The difference in height from a nip between the discharging rollers 52 and 53 to the discharge tray 2 is set to a comparatively large value to allow more sheets to be accumulated in the discharge tray 2.

A double-sided paper feeding unit 54 is removably mounted on the back of the image forming apparatus 100. The double-sided paper feeding unit 54 takes in and turns over the sheet 17 returned by reverse rotation of the conveying belt 21, and feeds again the sheet 17 between the counter roller 22 and the conveying belt 21. A bypass paper feeding unit (not illustrated in FIG. 2) is provided on the upper surface of the double-sided paper feeding unit 54.

Furthermore, as illustrated in FIG. 3, a maintenance and recovery mechanism 55 is placed, as a unit for maintenance to maintain and recover states of nozzles of the print head 13, at a non-printing area on one side in the scanning direction of the carriage 9.

The maintenance and recovery mechanism 55 includes caps 56, a wiper blade 57, and an idle ejection receiver 58. The caps 56 cap respective nozzle faces of the print head 13. The wiper blade 57 is a blade member for wiping the nozzle faces. The idle ejection receiver 58 receives liquid droplets when idle ejection is performed to eject the liquid droplets that do not contribute to recording so as to discharge a thickened recording liquid.

In the thus configured image forming apparatus 100, the sheets 17 are separated and fed, sheet by sheet, from the paper feeding tray 1. Each of the sheets 17 is fed substantially vertically upward, and guided by the guide 20. Then, the sheet is conveyed while being sandwiched between the conveying belt 21 and the counter roller 22. Further, the sheet 17 is guided, at the leading end thereof, by the conveyance guide 23, pressed onto the conveying belt 21 by the pressing roller 25, and changed in the conveyance direction thereof by approximately 90 degrees.

At this time, an engine control unit 334 (not illustrated in FIG. 3) controls an AC bias supply unit to apply an alternating voltage that alternately repeats positive and negative polarities to the roller charging device 26 so as to charge the conveying belt 21 in an alternating charging voltage pattern. Specifically, the conveying belt 21 is charged in a pattern in which the positive and negative polarities are repeated at predetermined widths in the sub-scanning direction that is the direction of circulation. The sheet 17 fed onto the conveying belt 21 thus charged is attached by the electrostatic force to the conveying belt 21, and the circulating movement of the conveying belt 21 conveys the sheet 17 in the sub-scanning direction.

The image forming apparatus 100, then, drives the print head 13 according to image signals while moving the carriage 9 in forward and backward directions so as to record one line of the image data by ejecting the ink droplets onto the stationary sheet 17, and after carrying the sheet 17 by a predetermined amount, records the next line. By receiving a record end signal or a signal indicating arrival of the trailing end of the sheet 17 at the recording area, the image forming apparatus 100 ends the recording operation, and discharges the sheet 17 to the discharge tray 2.

In the case of duplex printing, when the recording on the front surface (on which printing is first made) is finished, the image forming apparatus 100 rotates the conveying belt 21 in the reverse direction so as to feed the recorded sheet 17 into the double-sided paper feeding unit 54, and turns over the sheet 17. Then, the image forming apparatus 100 feeds again the sheet 17, with the back surface thereof serving as a printing surface, between the counter roller 22 and the conveying belt 21, and while performing timing control, the image forming apparatus 100 conveys the sheet 17 on the conveying belt 21 and performs printing on the back surface in the same manner as in the case of the recording on the front surface, thereafter discharging the sheet 17 to the discharge tray 2.

During a standby for printing (recording), the maintenance unit 333 of the image forming apparatus 100 controls the carriage 9 to move toward the maintenance and recovery mechanism 55, where the caps 56 cap the nozzle faces of the print head 13 so as to keep the nozzles wet to prevent defective ejection due to drying of the ink. The maintenance unit 333 also performs, as a maintenance operation, for example, a recovery operation in which the recording liquid is suctioned from the nozzles while the print head 13 is capped by the caps 56, and thus, the thickened recording liquid and air bubbles are discharged. To clean off the ink attached to the nozzle faces of the print head 13 by the recovery operation, the maintenance unit 333 controls the wiper blade 57 to perform wiping. The maintenance unit 333 also performs idle ejection operation to eject ink not intended for the recording, before the start of or during the recording. In this manner, the maintenance unit 333 maintains a stable ejection performance of the print head 13.

Figure 4:
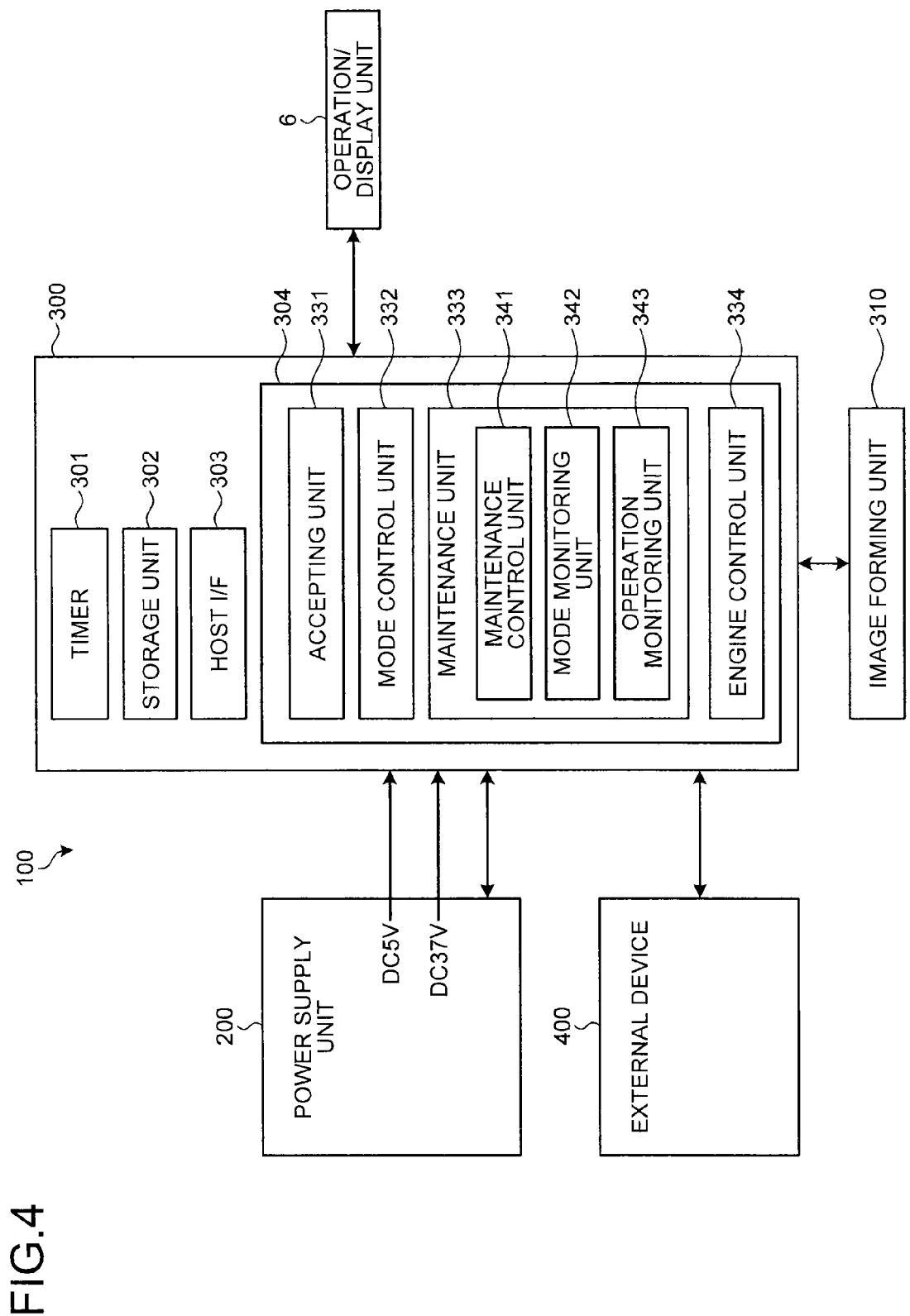
FIG. 4 is a block diagram explaining an overall configuration example of the image forming apparatus according to the first embodiment.
Figure 5:
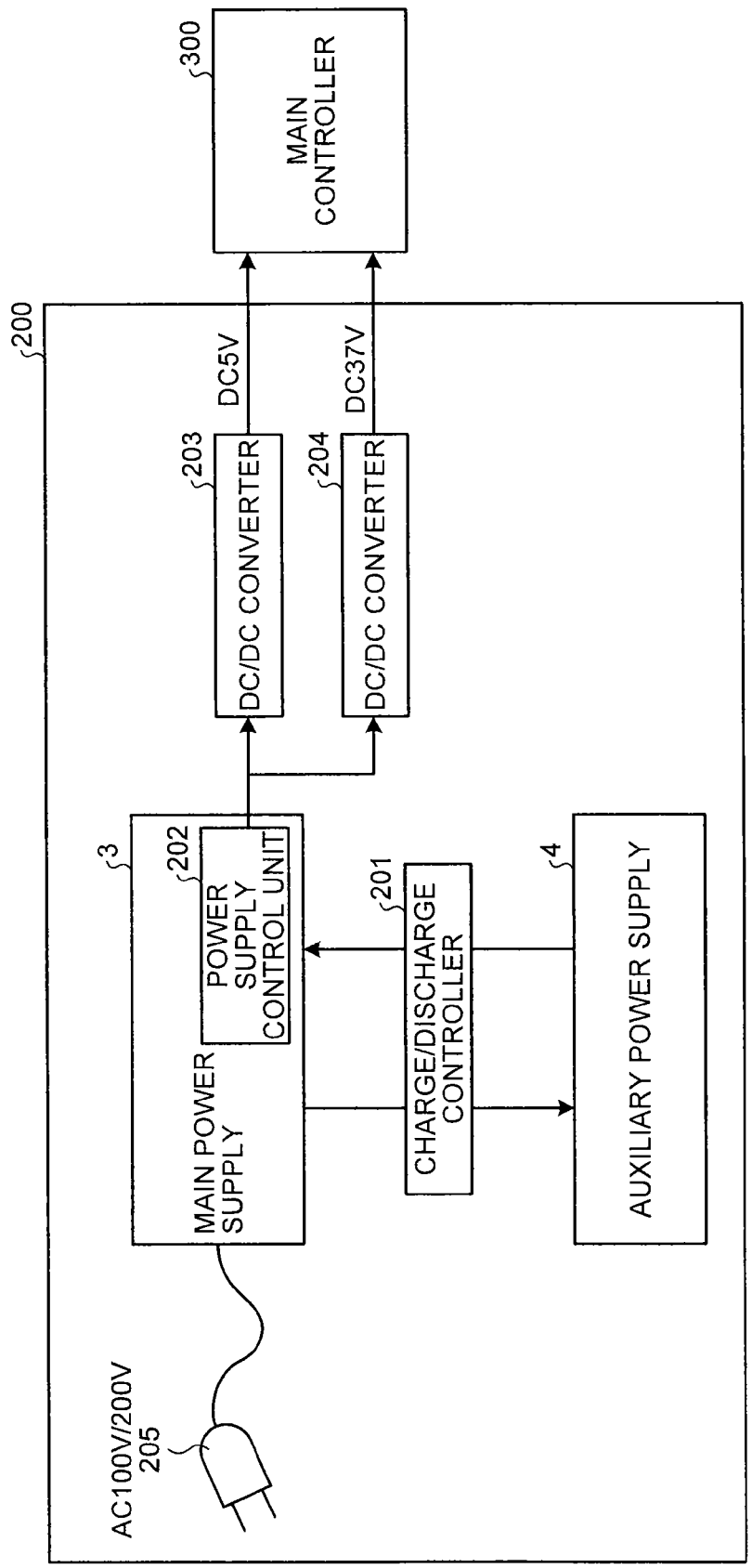
FIG. 5 is a block diagram explaining a configuration example of a power supply unit of the image forming apparatus according to the first embodiment.
Figure 6:
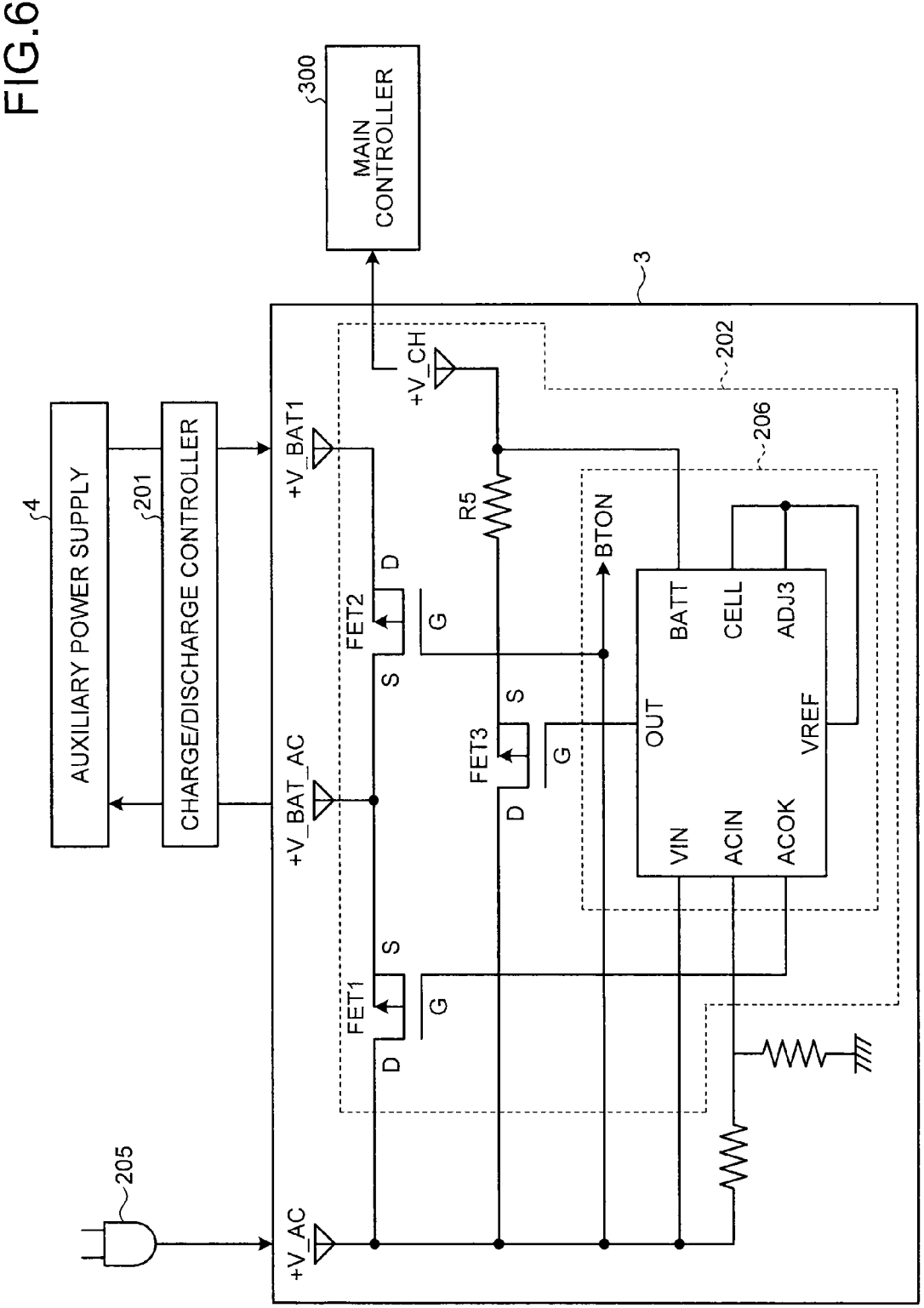
FIG. 6 is a block diagram explaining a configuration example of a power supply control circuit serving as a power supply control unit of the image forming apparatus according to the first embodiment.

An overall configuration example of the image forming apparatus will be described below. FIG. 4 is a block diagram explaining the overall configuration example of the image forming apparatus according to the present embodiment. FIG. 5 is a block diagram explaining a configuration example of a power supply unit. FIG. 6 is a block diagram explaining a configuration example of a power supply control circuit serving as a power supply control unit.

As illustrated in FIG. 4, the image forming apparatus 100 includes a power supply unit 200, a main controller 300, the operation/display unit 6, and an image forming unit 310.

As illustrated in FIG. 5, the power supply unit 200 includes the main power supply 3, the auxiliary power supply 4, a charge/discharge controller 201, a power supply control unit 202, and DC/DC converters 203 and 204. The main power supply 3 includes the power supply control unit 202. The main power supply 3 supplies the power from the commercial power supply (AC power supply). The main power supply 3 has a plug 205 that can be plugged into an outlet to which the commercial power is supplied. Plugging the plug 205 into the outlet connects the commercial power supply to the main power supply 3, which is, in turn, supplied with the power from the commercial power supply. The main power supply 3 feeds the power supplied from the commercial power supply to the power supply control unit 202. The alternating-current voltage is converted into a direct-current voltage, which is then converted, via the DC/DC converters 203 and 204, into a direct-current voltage that can be used in the image forming unit 310. In the present embodiment, a DC of 5 V and a DC of 37 V are fed at least to the main controller 300.

The auxiliary power supply 4 is, for example, a battery that can be charged and discharged. The power supplied from the main power supply 3 is fed to the auxiliary power supply 4 via the charge/discharge controller 201, and the auxiliary power supply 4 is charged. When no power is supplied from the commercial power supply, the auxiliary power supply 4 feeds power to the power supply control unit 202 via the charge/discharge controller 201. The power is converted, via the DC/DC converters 203 and 204, into that of the direct-current voltage that can be used in the main controller 300 and the image forming unit 310. In the present embodiment, the DC of 5 V and the DC of 37 V are fed at least to the main controller 300.

Under the control of the main controller 300, the charge/discharge controller 201 controls the charge and discharge of the auxiliary power supply 4. The charge/discharge controller 201 also detects the amount of charge (remaining capacity) of the auxiliary power supply 4. For example, the charge/discharge controller 201 can detect the amount of charge of the auxiliary power supply 4 based on an integrated current value in the auxiliary power supply 4 and a deterioration rate of capacity obtained from a temperature and the number of charging of the auxiliary power supply 4. The amount of charge of the auxiliary power supply 4 can be detected not only by this, but also by any method.

Under the control of the main controller 300, the charge/discharge controller 201 also switches between supply and stop of the power from the main power supply 3 to the auxiliary power supply 4. To charge the auxiliary power supply 4 with the power from the main power supply 3, the main controller 300 controls the charge/discharge controller 201 so as to feed the power from the main power supply 3 to the auxiliary power supply 4 via the charge/discharge controller 201.

The power supply control unit 202 includes a detection unit 206. Under the control of the main controller 300, the power supply control unit 202 switches the power supply source for at least the main controller 300. For example, the power supply control unit 202 can switch the power supply source to the main power supply 3 or to the auxiliary power supply 4. In the present embodiment, the power supply control unit 202 performs control of switching the power supply source to the main power supply 3 when power is supplied from the commercial power supply, or to the auxiliary power supply 4 when no power is supplied from the commercial power supply. In other words, the power supply control unit 202 performs control of switching the power supply source to the auxiliary power supply 4 when the main power supply 3 is off, and control of switching the power supply source to the main power supply 3 when the main power supply 3 is on.

Under the control of the main controller 300, the power supply control unit 202 can also switch a power supply destination (or power supply destinations). For example, the power supply control unit 202 can switch the power supply destinations to both the main controller 300 and the image forming unit 310, or switch the power supply destination to only the main controller 300.

A description will be made of the power supply switching control by the power supply control unit 202. As illustrated in FIG. 6, in the power supply control circuit of the power supply control unit 202, when the plug 205 is placed into a plugged-in state (+V_AC) of being connected to the commercial power supply, ACIN is detected, ACOK is set to Low level, and BTON is set to Hi level in the detection unit 206. At this time, in the power supply control circuit, FET1 is turned on, so that +V_BAT_AC is supplied with power of +V_AC. This allows the charge/discharge controller 201 to feed the power to the auxiliary power supply 4 to charge it. The power supply control unit 202 feeds power from +V_CH at least to the main controller 300.

In the power supply control circuit, disconnecting the plug 205 from the commercial power supply while the auxiliary power supply 4 is connected turns FET2 on, and thereby feeds power from +V_BAT1. In this case, BTON is set to Low level in the detection unit 206. The power from the auxiliary power supply 4 is fed via +V_CH at least to the main controller 300. In this manner, the power supply control unit 202 performs the control to switch the power supply source to the main power supply 3 or the auxiliary power supply 4.

A description will be made of timing diagrams of the power supply in the power supply control circuit. FIGS. 7A to 7D are diagrams explaining the timing diagrams of the power supply in the power supply control circuit according to the present embodiment.

Figure 7A:
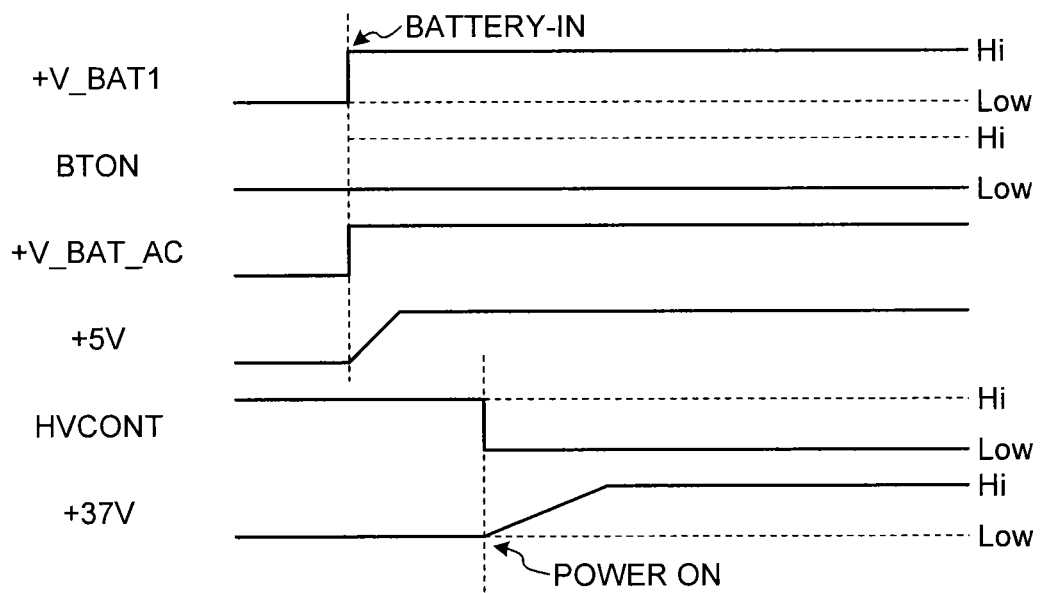
FIG. 7A is a diagram explaining a timing diagram of a power supply in the power supply control circuit according to the first embodiment.

FIG. 7A is a timing diagram of the power supply when the power is supplied only from the battery 4. As illustrated in FIG. 7A, in the power supply control circuit, loading the battery 4 (battery-in) causes +V_BAT1 to change from Low level to Hi level, and keeps BTON at Low level. At this time, the detection unit 206 detects that BTON is at Low level. HVCONT changes from Hi level to Low level, and +37 V changes from Low level to Hi level, thereby turning the power on. HVCONT is an enable signal for the DC/DC converter 204 of 37V, and is a signal received from the main controller 300.

Figure 7B:
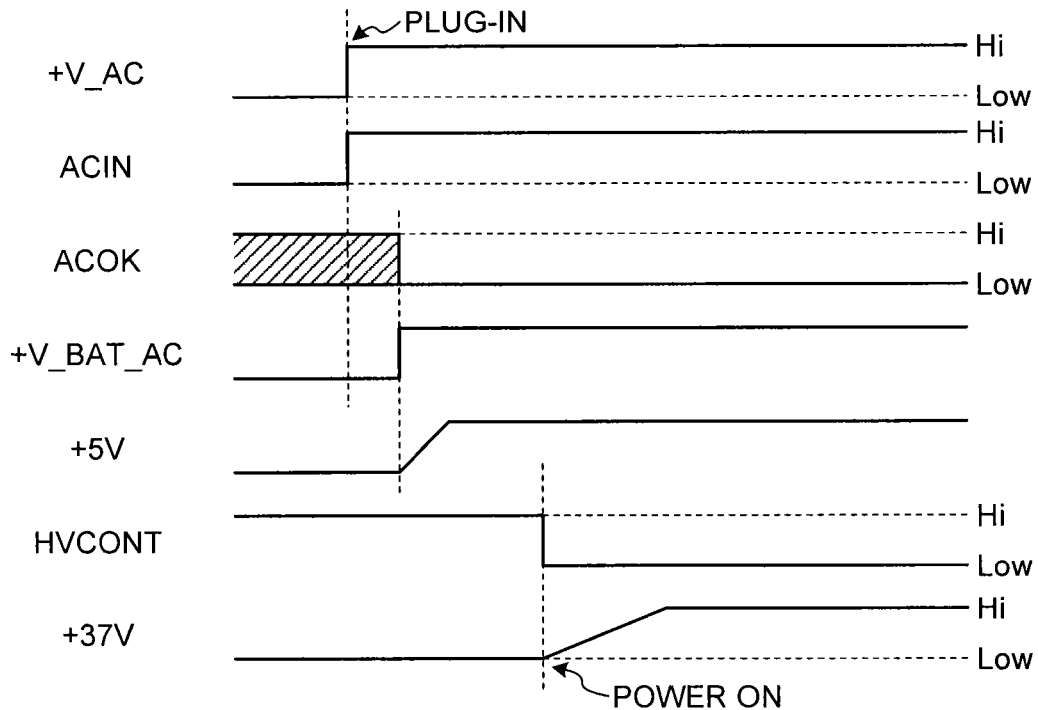
FIG. 7B is a diagram explaining a timing diagram of the power supply in the power supply control circuit according to the first embodiment.

FIG. 7B is a timing diagram of the power supply when the power is supplied only from the main power supply (commercial power supply). As illustrated in FIG. 7B, in the power supply control circuit, connecting the plug 205 to the commercial power supply (plug-in) changes the +V_AC from Low level to Hi level, ACIN from Low level to Hi level, and ACOK from Hi level to Low level. At this time, the detection unit 206 detects that ACIN is at Hi level, ACOK is at Low level, and BTON is at Hi level (not illustrated). HVCONT changes from Hi level to Low level, and +37 V changes from Low level to Hi level, thereby turning the power on.

Figure 7C:
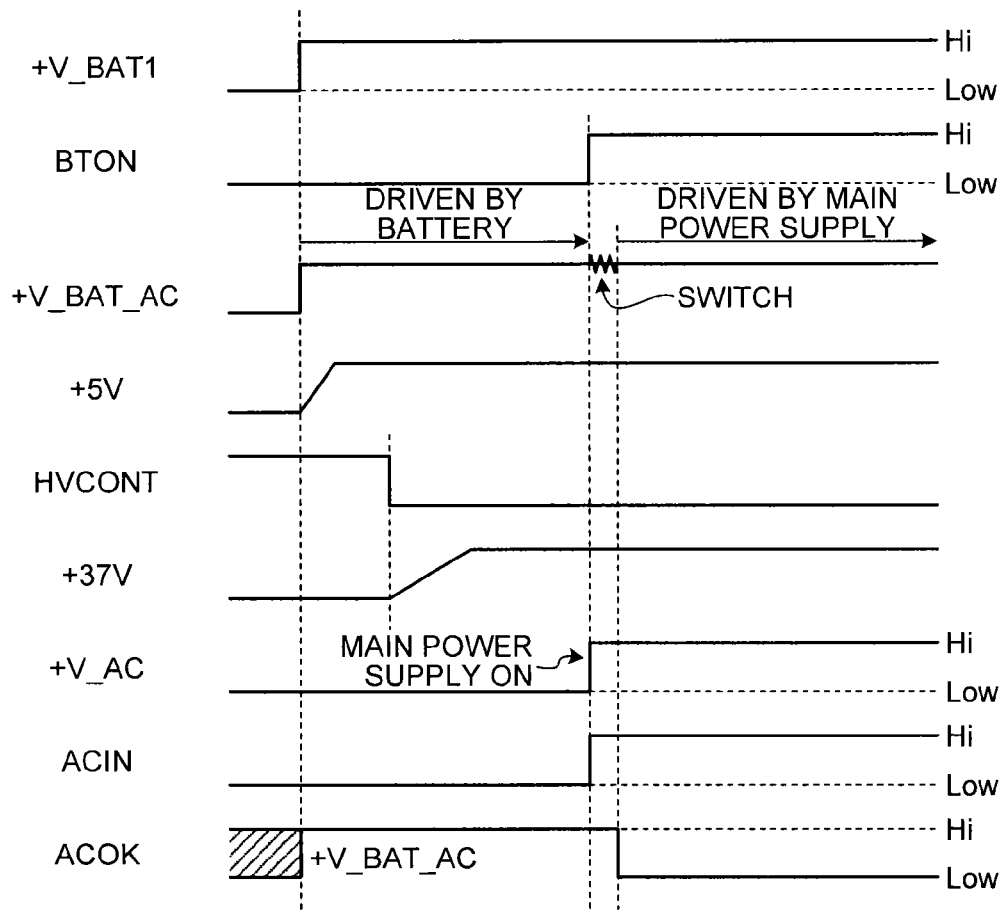
FIG. 7C is a diagram explaining a timing diagram of the power supply in the power supply control circuit according to the first embodiment.

FIG. 7C is a timing diagram of the power supply when the power supply is switched from the battery to the main power supply (commercial power supply). As illustrated in FIG. 7C, in the power supply control circuit, when the power is supplied from the battery 4, +V_BAT1 is at Hi level, and BTON is kept at Low level. Switching the power supply from the battery 4 to the main power supply 3 changes BTON from Low level to Hi level, +V_AC from Low level to Hi level. It also changes ACIN from Low level to Hi level, and ACOK from Hi level to Low level. At this time, the detection unit 206 detects that BTON is at Hi level, ACIN is at Hi level, and ACOK is at Low level.

Figure 7D:
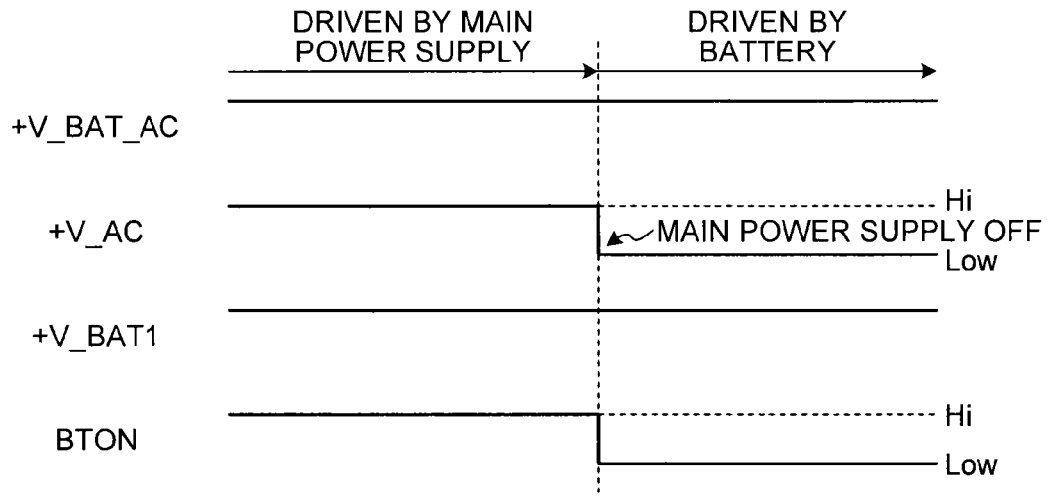
FIG. 7D is a diagram explaining a timing diagram of the power supply in the power supply control circuit according to the first embodiment.

FIG. 7D is a timing diagram of the power supply when the power supply is switched from the main power supply (commercial power supply) to the battery. As illustrated in FIG. 7D, in the power supply control circuit, when the power is supplied from the main power supply 3, +V_AC is kept at Hi level, and BTON is kept at Hi level. Switching the power supply from the main power supply 3 to the battery 4 changes +V_AC from Hi level to Low level, and BTON from Hi level to Low level. At this time, the detection unit 206 detects that BTON is at Low level.

In this manner, in the power supply control circuit of the main power supply 3, the detection unit 206 can determine that the power supply source is the battery 4 if BTON is detected as Low level, or that the power supply source is the main power supply 3 if BTON is detected as Hi level. The detection unit 206 can also determine that the power supply source is the main power supply 3 if ACOK is detected as Low level, or that the power supply source is the battery 4 if ACOK is detected as Hi level. Thus, the detection unit 206 can determine whether the power supply source is the main power supply 3 (commercial power supply) or the battery 4 by detecting whether BTON or ACOK is either at Hi level or at Low level.

The main controller 300 will be described below. As illustrated in FIG. 4, the main controller 300 controls the overall operation of the image forming apparatus 100 in an integrated manner. The main controller 300 includes a timer 301, a storage unit 302, a host I/F 303, and a control unit 304.

The timer 301 measures time. The timer 301 may have a real-time clock function of counting the current time. The storage unit 302 stores various types of data. The host I/F 303 receives image data from an external device, such as a host PC, via a cable or a network.

The control unit 304 controls various parts of the image forming apparatus 100. The control unit 304 has a configuration including, for example, a central processing unit (CPU) constituted, for example, by a microprocessor, a read-only memory (CPU), and a random access memory (RAM). As illustrated in FIG. 4, the control unit 304 has functions including the accepting unit 331, the mode control unit 332, the maintenance unit 333, and the engine control unit 334. The functions included in the control unit 304 are implemented by execution by the CPU in the control unit 304 of a predetermined control program stored, for example, in the ROM. However, not limited to this, at least some of the functions can be implemented by individual circuits (hardware).

The accepting unit 331 accepts various inputs from the operation/display unit 6 and the external device 400. The various inputs include a print job and various setting inputs, such as a setting of a power-saving mode described later. The print job is a command signal to request printing of print data included in the print job. The number of pieces of print data (number of printed copies) included in the print job can be set to any value. The print data is described in a language, such as a page description language (PDL). The print job can be treated as an image formation request of requesting the image forming unit 310 to form an image.

The mode control unit 332 controls switching into and out of various modes representing different operating states of the image forming apparatus 100. Details of the mode control unit 332 will be described later.

The maintenance unit 333 controls maintenance for the image forming unit 310. Details of the maintenance unit 333 will be described later.

The engine control unit 334 controls the operation of the image forming unit 310. Specifically, when the accepting unit 331 has accepted a print job, the engine control unit 334 performs image processing of print data contained in the accepted print job. For example, the engine control unit 334 converts the print data described in a language, such as the PDL, into image data drawn in a format (such as a bitmap format) printable by the image forming unit 310. Based on the converted image data, the engine control unit 334 controls the image forming unit 310 so as to form an image (perform printing) on a medium, such as a recording sheet. In other words, under the control of the engine control unit 334, the image forming unit 310 performs printing based on the print data contained in the print job.

The operation/display unit 6 includes the display screen and the operation keys. The display screen includes the touch panel. The display screen displays various screens and information on the image forming apparatus 100, and allows the user to input various operations from the touch panel. The operation keys are operation devices that accept various inputs from the user.

The image forming unit 310 includes the print heads 13. The image forming unit 310 forms the image on the medium, such as a recording sheet, under the control of the main controller 300. For example, the image forming unit 310 is equipped with at least the four print heads 13 that have the liquid ejection heads ejecting ink droplets of the respective four colors of black (K), cyan (C), magenta (M), and yellow (Y) as recording agents. The image forming unit 310 forms the image by ejecting the liquid droplets from the print heads 13 onto the recording medium. In the present embodiment, the configuration of the mechanical part of the image forming apparatus 100 and the configuration of the mechanical part of the image forming unit 310 are as described above using FIGS. 2 and 3, and the detailed description thereof will be omitted.

Figure 8:
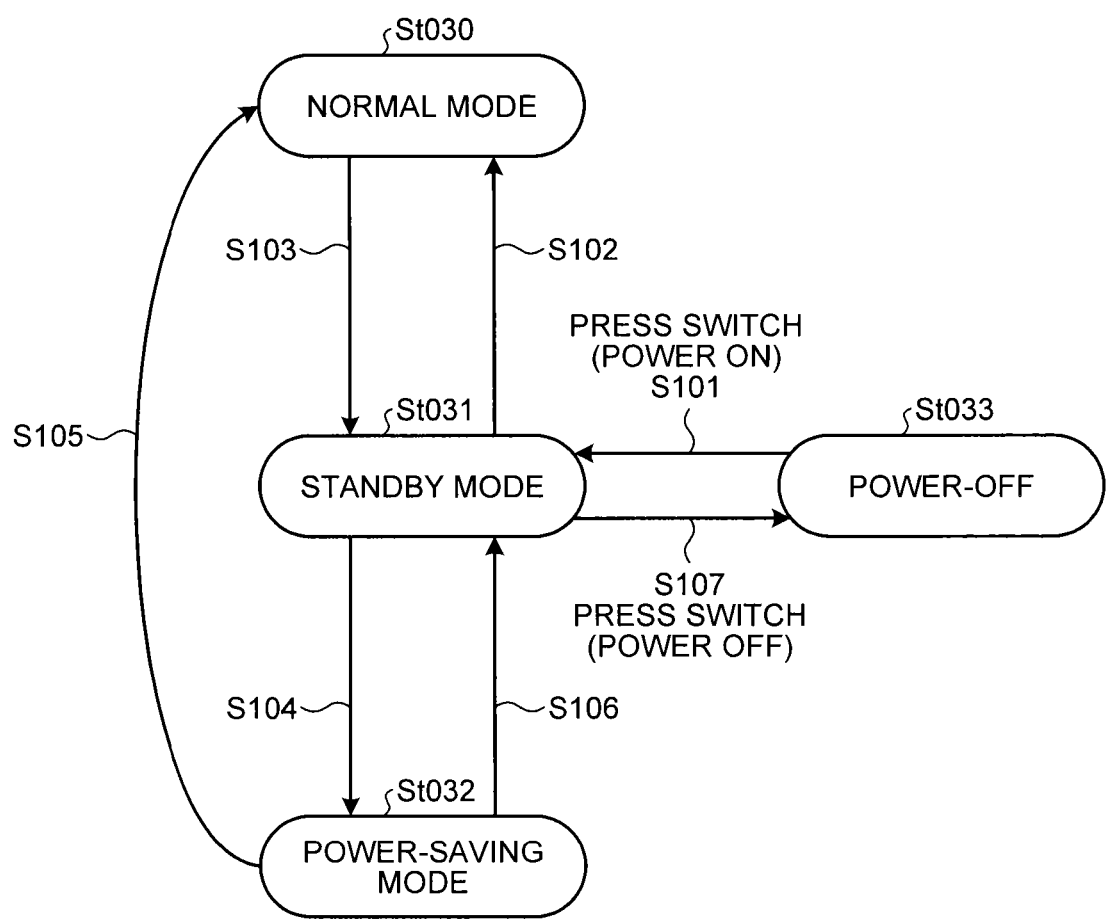
FIG. 8 is a schematic diagram explaining examples of various modes of the image forming apparatus according to the first embodiment.

The mode control unit 332 will be described below. FIG. 8 is a schematic diagram explaining examples of the various modes of the image forming apparatus according to the present embodiment. As illustrated in FIG. 8, the mode control unit 332 controls the switching into and out of the modes representing the respective different operating states of the image forming apparatus 100 according to the present embodiment. As illustrated in FIG. 8, in the present embodiment, the modes of the image forming apparatus 100 include, for example, a normal mode St030, a standby mode St031, a power-saving mode St032, and a power-off St033.

The normal mode St031 represents an operating state of the image forming apparatus 100 in which the image forming unit 310 performs the print (image forming) operation. In the normal mode St030, power necessary for the print operation is supplied, and both the main controller 300 and the image forming unit 310 operate, so that a large amount of power is consumed.

The standby mode St031 represents an operating state of the image forming apparatus 100 in which the image forming unit 310 does not perform printing. In the standby mode St031, the power necessary for the print operation is supplied, but the image forming unit 310 does not operate, so that the amount of power consumption is smaller than in the normal mode St030.

The power-saving mode St032 represents an operating state of the image forming apparatus 100 in which the image forming unit 310 does not perform printing. In the power-saving mode St032, the image forming unit 310 does not operate, and only the main controller 300 operates, so that the power is only supplied to the main controller 300. Specifically, the power-saving mode St032 represents, for example, a state in which a minimum amount of power is supplied that is necessary to receive data via a USB or a LAN and to detect operations (such as pressing of keys) on the operation/display unit 6, so that the amount of power consumption is smaller than in the standby mode.

The following describes the examples of the switching between the various modes controlled by the mode control unit 332. In FIG. 8, the mode control unit 332 performs control as follows: First, pressing a switch in the power-off St033 turns on the power supply (Step S101), and switches the mode into the standby mode St031. When a print command is received or a switch on a display panel is pressed, for example, to make a copy, in the standby mode St031, the mode control unit 332 switches the mode into the normal mode St031 (Step S102), and the image forming apparatus 100 performs the print operation. When a predetermined time set in advance has elapsed without a print command after the end of the print operation, the mode control unit 332 switches the mode into the standby mode St031 (Step S103).

When a predetermined time set in advance has elapsed in the standby mode St031, the mode control unit 332 switches the mode into the power-saving mode St032 (Step S104). When a print command is received or a switch on a display panel is pressed, for example, to make a copy, in the power-saving mode St032, the mode control unit 332 switches the mode into the standby mode St031 (Step S106) and then into the normal mode St031 (Step S102), and the image forming apparatus 100 performs the print operation. When the print command is received in the power-saving mode St032, the mode control unit 332 may directly switch the mode from the power-saving mode St032 into the normal mode St031 (Step S105), and the image forming apparatus 100 may thereafter perform the print operation. The direct switching from the power-saving mode St032 into the normal mode St031 can reduce printing time.

The user can change the setting of the selection for the switching operation from the power-saving mode St032 into the normal mode St030, for example, based on the amount of power consumption. When a switch is pressed in the standby mode St031, the mode control unit 332 turns the power off (Step S107). As described above, the mode control unit 332 controls the switching between the various modes.

The mode control unit 332 performs control of automatically switching the mode into the power-saving mode St032 when the predetermined time set in advance is exceeded in the standby mode St031. Specifically, the mode control unit 332 cuts off the power supply for driving the motors and the head necessary for the print operation. The predetermined time until the switching into the power-saving mode St032 that is set in advance is referred to as "power-saving mode St032 switching time".

The mode control unit 332 performs control in which, when the detection unit 206 detects that the power supply source is the auxiliary power supply 4, the power-saving mode St032 switching time is automatically reset from the predetermined time set in advance for the time when the power supply source is the main power supply 3 to a switching time shorter than the predetermined time. The mode control unit 332 performs control in which, when the power supply source detected by the detection unit 206 has been switched to the main power supply 3, the power-saving mode St032 switching time is automatically reset to the predetermined time set in advance for the time when the power supply source is the main power supply 3.

The mode control unit 332 obtains the time when the mode has been switched into the power-saving mode St032 with reference to the timer, and notifies a mode monitoring unit 342 in the maintenance unit 333 of the time. The mode control unit 332 obtains the time when the mode has been switched into the normal mode St031 with reference to the timer, and notifies the mode monitoring unit 342 in the maintenance unit 333 of the time.

Figures 9, 10:
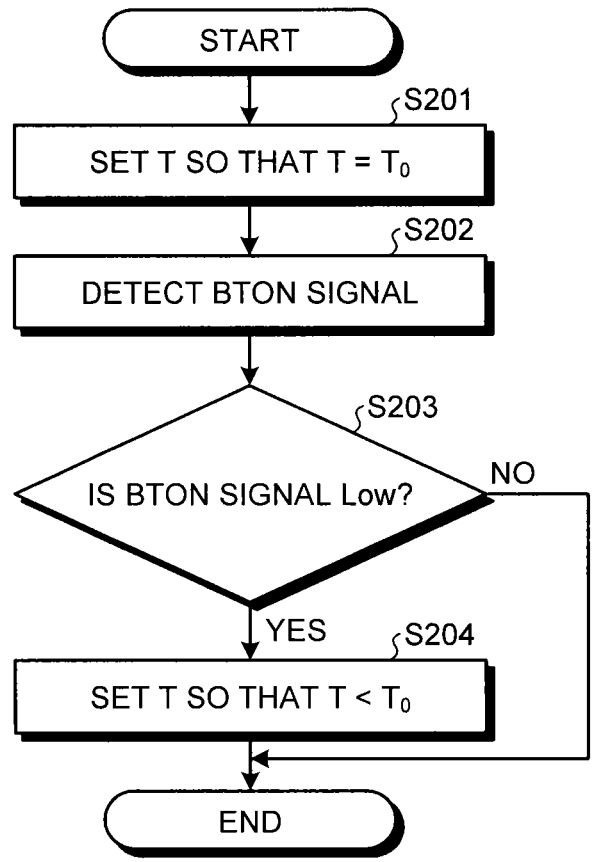
FIG. 9 is a flowchart illustrating an example of a procedure for a control operation of a mode control unit according to the first embodiment.
FIG. 10 is a diagram explaining examples of conditions and types of nozzle maintenance of a maintenance unit according to a second embodiment of the present invention.

A control operation example of the mode control unit 332 will be described below. FIG. 9 is a flowchart illustrating an example of a procedure for the control operation of the mode control unit 332 of the present embodiment. As illustrated in FIG. 9, when the main power supply 3 (commercial power supply) has started supplying power to the image forming apparatus 100, the mode control unit 332 automatically sets a switching time T into the power-saving mode St032 to a time $T_0$ set for the time when the power is supplied from the main power supply 3 (Step S201).

Then, so as to determine whether the power supply source of the image forming apparatus 100 is the main power supply 3 or the auxiliary power supply 4, the mode control unit 332 detects the BTON signal sensed by the detection unit 206 (Step S202). The mode control unit 332 then determines whether the BTON signal is at Low level (Step S203). If not (No at Step S203), the mode control unit 332 determines that the power supply source is the main power supply 3, and ends the process while maintaining the setting of $T=T_0$. If the BTON signal is at Low level (Yes at Step S203), the mode control unit 332 determines that the power supply source is the auxiliary power supply 4, and automatically sets the switching time T into the power-saving mode St032 to a shorter time so that $T<T_0$ (Step S204), and ends the process.

By performing the above-described process, the image forming apparatus 100 performs, without manual resetting of the switching time T by the user, the power supply control of controlling the operation depending on the power supply source driving the apparatus, and thereby can reduce the power consumption.

In this manner, when the detection unit 206 detects that the power supply source is the auxiliary power supply 4, the mode control unit 332 of the present embodiment automatically sets the power-saving mode St032 switching time T to the switching time T shorter than the switching time $T_0$ set in advance for the time when the power supply source is the main power supply 3. This eliminates the necessity of manual resetting of the switching time from $T_0$ to the shorter switching time T by the user.

When the detection unit 206 detects that the power supply source is the auxiliary power supply 4, the mode control unit 332 automatically changes the setting of the switching time into the power-saving mode St032 from the switching time $T_0$ to the shorter switching time T. This causes the mode control unit 332 to switch the mode into the power-saving mode allowing the lowest power consumption when the power supply source is the auxiliary power supply 4. This can, in turn, reduce the power consumption when the apparatus is driven by the auxiliary power supply 4, and thereby can extend the duration of the auxiliary power supply 4.

As described above, the present embodiment can reduce the power consumption when the apparatus is driven by the auxiliary power supply 4.

Second Embodiment

A second embodiment will be described below. In the present embodiment, the control unit 304 further includes the maintenance unit 333. The maintenance unit 333 controls maintenance operations of the image forming unit 310. The maintenance unit 333 controls the maintenance operations that maintain and recover the state of the nozzles of the print head 13.

Specifically, the maintenance unit 333 performs control of halting the maintenance operations when the detection unit 206 detects that the power supply source is the auxiliary power supply 4, and performs control of executing the maintenance operations when the power supply source has been switched from the auxiliary power supply 4 to the main power supply 3. The specific details will be described below. Detailed description will be omitted as appropriate for parts duplicating those of the above-described first embodiment.

As illustrated in FIG. 4, the maintenance unit 333 includes a maintenance control unit 341, the mode monitoring unit 342, and an operation monitoring unit 343.

The maintenance control unit 341 controls the maintenance operations of the image forming unit 310 in an integrated manner. For example, in the inkjet recording device, so as to prevent clogging caused by drying of the nozzles, the maintenance control unit 341 performs control of automatically executing the maintenance operations of the nozzles when the print head 13 is not driven (stopped injecting the ink) for a preset time or longer.

Specifically, as illustrated in FIG. 3, the maintenance control unit 341 performs, for example, the recovery operation in which the recording liquid is suctioned from the nozzles while the print head 13 is capped by the caps 56, and thus, the thickened recording liquid and air bubbles are discharged. To clean off the ink attached to the nozzle faces of the print head 13 by the recovery operation, the maintenance control unit 341 controls the wiper blade 57 to perform wiping of the nozzle faces. The maintenance control unit 341 also performs, for example, the idle ejection operation to eject ink not intended for the recording outside the printing area, before the start of or during the recording. The maintenance control unit 341 also performs, for example, an operation of filling the head with ink (circulating the ink into the head). In this manner, the maintenance control unit 341 maintains the stable ejection performance of the print head 13. The maintenance control unit 341 controls the timing of these maintenance operations.

The maintenance control unit 341 performs the above-mentioned control of halting the maintenance operations of the nozzles when the detection unit 206 detects that the power supply source is the auxiliary power supply 4, and control of executing the maintenance operations when the power supply source has been switched from the auxiliary power supply 4 to the main power supply 3. By performing this control, the maintenance control unit 341 stops the maintenance operations when the apparatus is driven by the auxiliary power supply 4, and thereby can reduce the power consumed for the maintenance operations, thus being able to reduce the power consumption when the apparatus is driven by the auxiliary power supply 4.

The mode monitoring unit 342 monitors the operating mode state of the image forming apparatus 100 and the elapsed time of the operating mode state. For example, while the apparatus is driven by the auxiliary power supply 4, the mode monitoring unit 342 monitors the time from the time when the operating mode state of the image forming apparatus 100 is switched into that of the power-saving mode St032 to the time when the operating mode state is switched into that of the normal mode St030. The mode monitoring unit 342 stores times $T_1$ to $T_n$ during each of which the operating mode state was that of the power-saving mode St032, and transfers the times $T_1$ to $T_n$ to the maintenance control unit 341.

The operation monitoring unit 343 monitors a number Y of printed (image-formed) copies of the image forming apparatus 100 and the time from the time when the printing ends to the time when the power supply source is switched. The operation monitoring unit 343 monitors and stores, for example, the number Y of copies printed by the image forming apparatus 100 while the apparatus is driven by the auxiliary power supply 4. The operation monitoring unit 343 also monitors and stores, for example, a time Ta from the time when the printing ends to the time when the power supply source is switched while the apparatus is driven by the auxiliary power supply 4. More specifically, the operation monitoring unit 343 stores numbers ($T_1$ to $Y_n$) of copies printed during the time when the detection unit 206 detects that the power supply source is the auxiliary power supply 4, calculates and stores the total number Y of printed copies, and transfers the total number Y of printed copies to the maintenance control unit 341. The operation monitoring unit 343 also measures and stores the elapsed time Ta from the time when the last printing ends to the time when the power supply source is switched to the main power supply 3 during the time when the detection unit 206 detects that the power supply source is the auxiliary power supply 4.

The following describes examples of maintenance conditions and maintenance types used when the maintenance unit 333 of the present embodiment performs the maintenance operations. FIG. 10 is a diagram explaining the examples of the conditions and the types of nozzle maintenance by the maintenance unit of the present embodiment. The maintenance conditions illustrated in FIG. 10 are determination conditions used when the maintenance unit 333 performs the maintenance operations. The maintenance types illustrated therein are types and combinations of the maintenance operations. Based on the maintenance conditions, the maintenance unit 333 selects types of maintenance, and performs the maintenance operations.

The maintenance types can be set, for example, by optionally combining the following maintenance operations (1) to (3).

(1) Operation of filling the print head 13 with ink (circulating the ink into the print head 13)

(2) Idle ejection operation of ejecting the ink outside the printing area (3) Operation of performing the recovery operation to suction the recording liquid from the nozzles and thus to discharge the thickened recording liquid and air bubbles, and wiping the nozzle faces with the wiper blade 57 to clean off the ink attached to the nozzle faces of the print head 13 by the recovery operation The maintenance operations are not limited to these, but any maintenance operation can be employed.

The maintenance conditions are, for example, conditions (to be described later) to be satisfied by an optional time $Tk_0$ and a cumulative time Tk of the times stored by the mode monitoring unit 342 during which the operating mode state was that of the power-saving mode St032 when the power supply source was the auxiliary power supply 4. The maintenance conditions are not limited to these, but any maintenance conditions can be employed.

The following describes the maintenance conditions and the maintenance types used when the maintenance unit 333 performs the maintenance operations, by way of examples of the maintenance conditions (conditions to be satisfied by the cumulative time Tk and the optional time $Tk_0$) and the maintenance types as combinations of (1) to (3), described above. $Tk_0$ illustrated in FIG. 10 is an optional time set in advance. The optional time $Tk_0$ normally serves as a condition under which the maintenance operation of the nozzles automatically starts after the print head 13 has not been driven for $Tk_0$ or longer.

In the present embodiment, when performing the maintenance operations, the maintenance unit 333 compares the cumulative time Tk with the preset time $Tk_0$ using, as examples of the maintenance conditions, the conditions to be satisfied by the cumulative time Tk and the optional time $Tk_0$. Based on the result of comparison, the maintenance unit 333 selects and performs one of A to D as an example of the maintenance types illustrated in FIG. 10. Specifically, if, for example, $Tk<(1/10) \times Tk_0$, the maintenance unit 333 selects and performs, for example, Maintenance A (no maintenance operation) because the cumulative time Tk is far shorter than the preset time $Tk_0$. If $(1/10) \times Tk_0 < Tk < Tk_0$, the maintenance unit 333 selects and performs, for example, Maintenance B (a set of (1), (2), and (3), each being performed once) corresponding to normal maintenance operations. If $Tk_0 < Tk < 2 \times Tk_0$, the maintenance unit 333 selects and performs, for example, Maintenance C (the set of (1), (2), and (3), each being performed twice) because the cumulative time Tk is longer. If $2 \times Tk_0 < Tk$, the maintenance unit 333 selects and performs, for example, Maintenance D (the set of (1), (2), and (3), each being performed three times) because the cumulative time Tk is much longer. The maintenance types A to D performed by the maintenance unit 333 are not limited to the above-described combinations, but can be any combination of the maintenance operations depending on the state of the print head 13.

Figure 11:
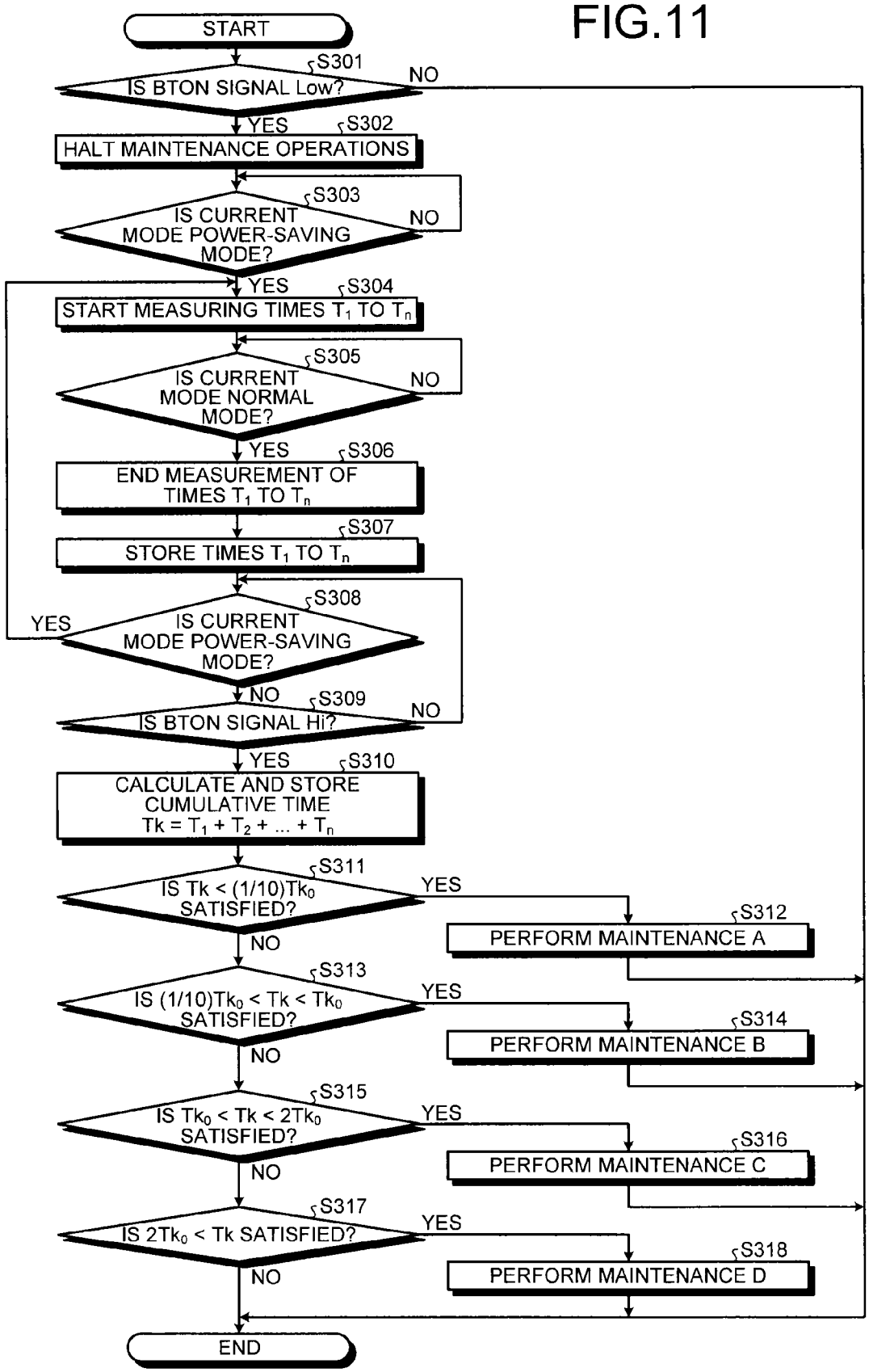
FIG. 11 is a flowchart explaining a control operation example of the maintenance unit carried out in an image forming apparatus according to the second embodiment.

The following describes a control operation example of the maintenance unit 333 carried out in the image forming apparatus 100. FIG. 11 illustrates the control operation example of the maintenance unit carried out in the image forming apparatus of the present embodiment. FIG. 11 is a flowchart illustrating an example of a procedure when the maintenance unit performs the maintenance operations based on the cumulative time Tk.

As illustrated in FIG. 11, so as to determine whether the power supply source of the image forming apparatus 100 is the main power supply 3 or the auxiliary power supply 4, the maintenance control unit 341 of the maintenance unit 333 determines whether the BTON signal detected by the detection unit 206 is at Low level (Step S301). If not (No at Step S301), the maintenance control unit 341 determines that the power supply source is the main power supply 3, and ends the process. If the BTON signal is at Low level (Yes at Step S301), the maintenance control unit 341 determines that the power supply source is the auxiliary power supply 4, and halts the maintenance operations (Step S302).

Then, the mode monitoring unit 342 determines whether the current mode controlled by the mode control unit 332 is the power-saving mode St032 (Step S303). If not (No at Step S303), the mode monitoring unit 342 repeats the determination process of whether the current mode is the power-saving mode St032. If the current mode is the power-saving mode St032 (Yes at Step S303), the mode monitoring unit 342 obtains, from the mode control unit 332, the time when the operating mode state of the image forming apparatus 100 changed to that of the power-saving mode St032, and starts measuring the elapsed times ($T_1$ to $T_n$) of being in the state of the power-saving mode St032 (Step S304).

Then, the mode monitoring unit 342 determines whether the current mode controlled by the mode control unit 332 is the normal mode St031 (Step S305). If not (No at Step S305), the mode monitoring unit 342 repeats the determination process of whether the current mode is the normal mode St030. If the current mode is the normal mode St031 (Yes at Step S305), the mode monitoring unit 342 obtains, from the mode control unit 332, the time when the operating mode state of the image forming apparatus 100 changed to that of the normal mode St030, ends the measurement of the elapsed times ($T_1$ to $T_n$) of the state of the power-saving mode St032 (Step S306), and stores the elapsed times ($T_1$ to $T_n$) during which the operating mode state was that of the power-saving mode St032 (Step S307).

Then, the mode monitoring unit 342 determines whether the current mode controlled by the mode control unit 332 is the power-saving mode St032 (Step S308). If so (Yes at Step S308), the mode monitoring unit 342 returns the process to Step S304, and repeats the process of measuring the elapsed times ($T_1$ to $T_n$) during which the operating mode state was that of the power-saving mode St032. If not (No at Step S308), the maintenance control unit 341 determines whether the BTON signal detected by the detection unit 206 is at Hi level (Step S309) so as to determine whether the power supply source of the image forming apparatus 100 is the main power supply 3 or the auxiliary power supply 4. If the BTON signal is not at Hi level (No at Step S309), the maintenance control unit 341 determines that the power supply source is the auxiliary power supply 4, then returns the process to Step S308, and repeats the determination process of whether the current mode is the power-saving mode St032. If the BTON signal is at Hi level (Yes at S309), the maintenance control unit 341 determines that the power supply source has been switched to the main power supply 3, and calculates and stores the cumulative time Tk ($Tk=T_1+T_2+\ldots+T_n$) of the elapsed times ($T_1$ to $T_n$) during which the operating mode state was that of the power-saving mode St032 (Step S310).

Then, the maintenance control unit 341 determines whether the cumulative time Tk satisfies $Tk<(1/10) \times Tk_0$ (Step S311). If so (Yes at Step S311), the maintenance control unit 341 performs Maintenance A (at Step S312), and ends the process.

If not (No at Step S311), the maintenance control unit 341 determines whether the cumulative time Tk satisfies $(1/10) \times Tk_0 < Tk < Tk_0$ (Step S313). If $(1/10) \times Tk_0 < Tk < Tk_0$ (Yes at Step S313), the maintenance control unit 341 performs Maintenance B (at Step S314), and ends the process.

If not (No at Step S313), the maintenance control unit 341 determines whether the cumulative time Tk satisfies $Tk_0 < Tk < 2Tk_0$ (Step S315). If $Tk_0 < Tk < 2Tk_0$ (Yes at Step S315), the maintenance control unit 341 performs Maintenance C (at Step S316), and ends the process.

If not (No at Step S315), the maintenance control unit 341 determines whether the cumulative time Tk satisfies $2Tk_0 < Tk$ (Step S317). If $2Tk_0 < Tk$ (Yes at Step S317), the maintenance control unit 341 performs Maintenance D (at Step S318), and ends the process. If not (No at Step S317), the maintenance control unit 341 ends the process.

By performing the above-described process, the image forming apparatus 100 can maintain the maintenance effect on the nozzles while reducing the power consumption when the apparatus is driven by the auxiliary power supply 4.

In this manner, the maintenance unit 333 of the present embodiment performs the control of halting the maintenance operations while the power is supplied from the auxiliary power supply 4, and performs the control of performing the various maintenance operations based on the maintenance conditions (to be satisfied, at the time when the power supply source is switched to the main power supply 3 [commercial power supply], by the cumulative time Tk of the times during which the operating mode state was that of the power-saving mode St032). By performing this control, the maintenance unit 333 stops the maintenance operations when the apparatus is driven by the auxiliary power supply 4, and thereby can reduce the power consumed for the maintenance operations, thus being able to reduce the power consumption when the apparatus is driven by the auxiliary power supply 4.

The maintenance unit 333 selects and performs an effective type of maintenance based on the maintenance conditions (to be satisfied, at the time when the power supply source is switched from the auxiliary power supply 4 to the main power supply 3, by the cumulative time Tk of the times during which the operating mode state was that of the power-saving mode St032), and thereby can maintain the maintenance effect on the nozzles.

As described above, the present embodiment can reduce the power consumption when the apparatus is driven by the auxiliary power supply 4, and can also maintain the maintenance effect on the nozzles.

Third Embodiment

A third embodiment will be described below. In the present embodiment, when performing the maintenance operations, the maintenance unit 333 performs control of performing the maintenance operations, based on the cumulative time Tk of the times during which the mode was the power-saving mode St032 between the time when the mode was switched into the power-saving mode St032 while the power was supplied from the auxiliary power supply 4 and the time when the power supply source was switched to the main power supply 3, and also on the elapsed time Ta from the time when the last image forming operation ended while the power was supplied from the auxiliary power supply 4 to the time when the power supply source was switched to the main power supply 3. The specific details will be described below. Detailed description will be omitted as appropriate for parts duplicating those of the first or the second embodiments described above.

Figure 12:
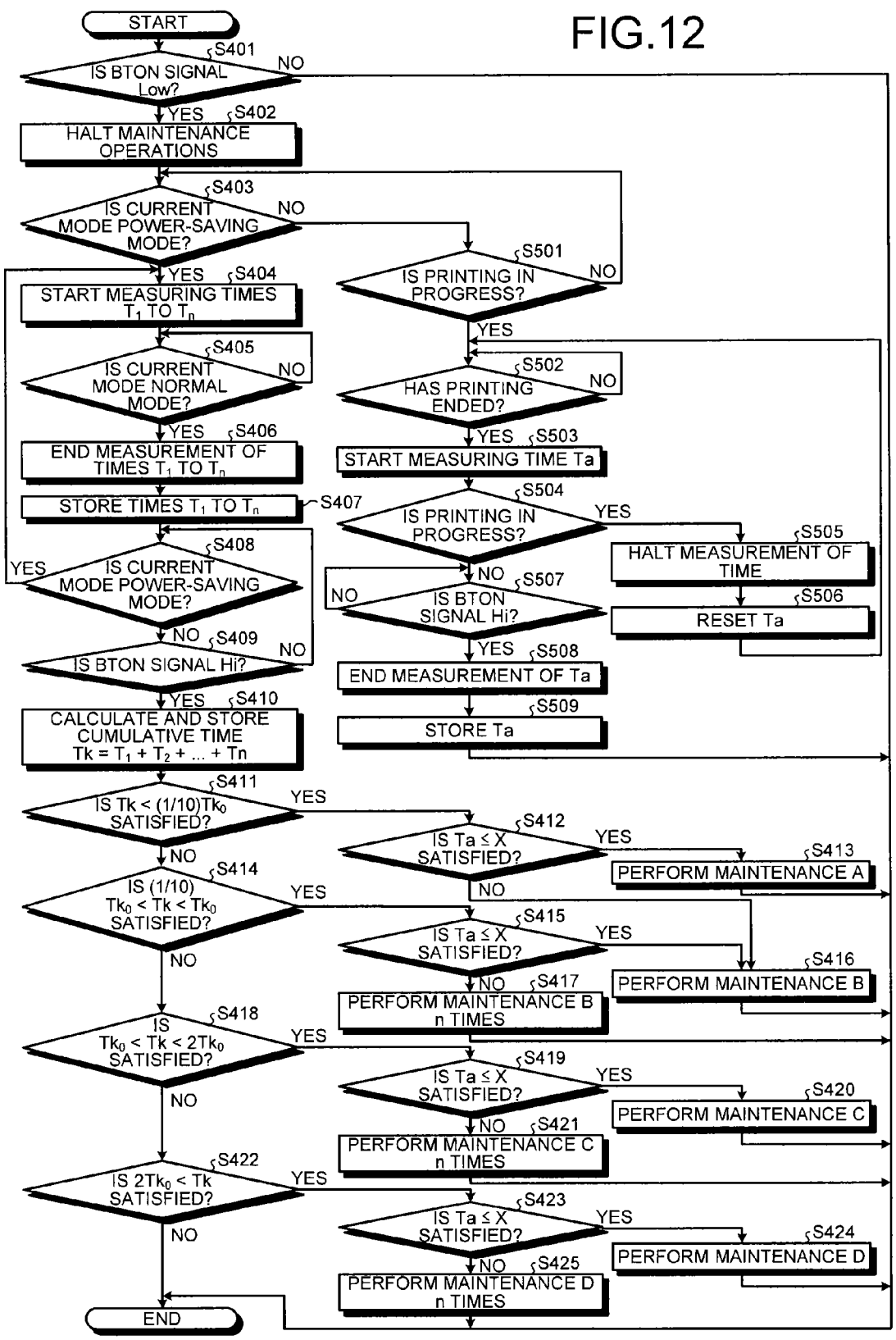
FIG. 12 is a flowchart explaining a control operation example of a maintenance unit carried out in an image forming apparatus according to a third embodiment the present invention.

FIG. 12 illustrates a control operation example of the maintenance unit carried out in the image forming apparatus of the present embodiment. FIG. 12 is a flowchart illustrating an example of a procedure when the maintenance unit performs the maintenance operations based on the cumulative time Tk and the elapsed time from the time when the last image forming operation ended to the time when the power supply source was switched to the main power supply.

As illustrated in FIG. 12, so as to determine whether the power supply source of the image forming apparatus 100 is the main power supply 3 or the auxiliary power supply 4, the maintenance control unit 341 of the maintenance unit 333 determines whether the BTON signal detected by the detection unit 206 is at Low level (Step S401). If not (No at Step S401), the maintenance control unit 341 determines that the power supply source is the main power supply 3, and ends the process. If the BTON signal is at Low level (Yes at Step S401), the maintenance control unit 341 determines that the power supply source is the auxiliary power supply 4, and halts the maintenance operations (Step S402).

Then, the mode monitoring unit 342 determines whether the current mode controlled by the mode control unit 332 is the power-saving mode St032 (Step S403). If not (No at Step S403), the operation monitoring unit 343 determines whether printing is in progress (Step S501). If printing is not in progress (No at Step S501), the operation monitoring unit 343 returns the process to Step S403, and repeats the determination process of whether the current mode is the power-saving mode St032. If printing is in progress (Yes at Step S501), the operation monitoring unit 343 determines whether the printing has ended (Step S502). If the printing has not ended (No at Step S502), the operation monitoring unit 343 repeats the determination of whether the printing has ended. If the printing has ended (Yes at Step S502), the operation monitoring unit 343 obtains the print end time, and starts measuring the elapsed time Ta from the end time (Step S503).

Then, the operation monitoring unit 343 determines whether printing is in progress (Step S504). If so (Yes at Step S504), the operation monitoring unit 343 halts the measurement of the elapsed time Ta (Step S505), and resets the elapsed time Ta (Step S506). The operation monitoring unit 343 returns the process to Step S502, and repeats the determination process of whether the printing has ended. If, at Step S504, printing is not in progress (No at Step S504), the maintenance control unit 341 determines whether the BTON signal detected by the detection unit 206 is at Hi level (Step S507) so as to determine whether the power supply source of the image forming apparatus 100 is the main power supply 3 or the auxiliary power supply 4. If the BTON signal is not at Hi level (No at Step S507), the maintenance control unit 341 determines that the power supply source is not the main power supply 3, and repeats the determination process of whether the BTON signal is at Hi level. If the BTON signal is at Hi level (Yes at Step S507), the maintenance control unit 341 determines that the power supply source is the main power supply 3, and the operation monitoring unit 343 ends the measurement of the elapsed time Ta (Step S508), stores the elapsed time Ta (Step S509), and ends the process.

Referring back to Step S403, if the current mode controlled by the mode control unit 332 is the power-saving mode St032 (Yes at Step S403), the mode monitoring unit 342 obtains, from the mode control unit 332, the time when the operating mode state of the image forming apparatus 100 changed to that of the power-saving mode St032, and starts measuring the elapsed times ($T_1$ to $T_n$) of the state of the power-saving mode St032 (Step S404).

Then, the mode monitoring unit 342 determines whether the current mode controlled by the mode control unit 332 is the normal mode St031 (Step S405). If not (No at Step S405), the mode monitoring unit 342 repeats the determination process of whether the current mode is the normal mode St030. If the current mode is the normal mode St031 (Yes at Step S405), the mode monitoring unit 342 obtains, from the mode control unit 332, the time when the operating mode state of the image forming apparatus 100 changed to that of the normal mode St030, ends the measurement of the elapsed times ($T_1$ to $T_n$) of the state of the power-saving mode St032 (Step S406), and stores the elapsed times ($T_1$ to $T_n$) during which the operating mode state was that of the power-saving mode St032 (Step S407).

Then, the mode monitoring unit 342 determines whether the current mode controlled by the mode control unit 332 is the power-saving mode St032 (Step S408). If so (Yes at Step S408), the mode monitoring unit 342 returns the process to Step S404, and repeats the process of measuring the elapsed times ($T_1$ to $T_n$) during which the operating mode state was that of the power-saving mode St032. If not (No at Step S408), the maintenance control unit 341 determines whether the BTON signal detected by the detection unit 206 is at Hi level (Step S409) so as to determine whether the power supply source of the image forming apparatus 100 is the main power supply 3 or the auxiliary power supply 4. If the BTON signal is not at Hi level (No at Step S409), the maintenance control unit 341 determines that the power supply source is the auxiliary power supply 4, then returns the process to Step S408, and repeats the determination process of whether the current mode is the power-saving mode St032. If the BTON signal is at Hi level (Yes at S409), the maintenance control unit 341 calculates and stores the cumulative time Tk ($Tk=T_1+T_2+\ldots+T_n$) of the elapsed times ($T_1$ to $T_n$) during which the operating mode state was that of the power-saving mode St032 (Step S410).

Then, the maintenance control unit 341 determines whether the cumulative time Tk satisfies $Tk<(1/10)\times Tk_0$ (Step S411). If $Tk<(1/10)\times Tk_0$ (Yes at Step S411), the maintenance control unit 341 compares the elapsed time Ta stored at Step S509 with a preset time X, and determines whether $Ta \leq X$ (Step S412). The preset time X is any time and can be changed. If $Ta \leq X$ (Yes at Step S412), the maintenance control unit 341 performs Maintenance A (at Step S413), and ends the process. If not (No at Step S412), the maintenance control unit 341 performs Maintenance B (at Step S416), and ends the process.

If not [$Tk<(1/10)\times Tk_0$] (No at Step S411), the maintenance control unit 341 determines whether the cumulative time Tk satisfies $(1/10)\times Tk_0<Tk<Tk_0$ (Step S414). If $(1/10)\times Tk_0<Tk<Tk_0$ (Yes at Step S414), the maintenance control unit 341 compares the elapsed time Ta stored at Step S509 with the preset time X, and determines whether $Ta \leq X$ (Step S415). The preset time X is any time and can be changed. If $Ta \leq X$ (Yes at Step S415), the maintenance control unit 341 performs Maintenance B (at Step S416), and ends the process. If not (No at Step S415), the maintenance control unit 341 repeats Maintenance B n times (at Step S417), and ends the process. The number n of repeats can be set to any value.

If not [$(1/10)\times Tk_0<Tk<Tk_0$] (No at Step S414), the maintenance control unit 341 determines whether the cumulative time Tk satisfies $Tk_0<Tk<2Tk_0$ (Step S418). If $Tk_0<Tk<2Tk_0$ (Yes at Step S418), the maintenance control unit 341 compares the elapsed time Ta stored at Step S509 with the preset time X, and determines whether $Ta \leq X$ (Step S419). The preset time X is any time and can be changed. If $Ta \leq X$ (Yes at Step S419), the maintenance control unit 341 performs Maintenance C (at Step S420), and ends the process. If not (No at Step S419), the maintenance control unit 341 repeats Maintenance C n times (at Step S421), and ends the process. The number n of repeats can be set to any value.

>If not ($Tk_0<Tk<2Tk_0$) (No at Step S418), the maintenance control unit 341 determines whether the cumulative time Tk satisfies $2Tk_0<Tk$ (Step S422). If $2Tk_0<Tk$ (Yes at Step S422), the maintenance control unit 341 compares the elapsed time Ta stored at Step S509 with the preset time X, and determines whether $Ta \leq X$ (Step S423). The preset time X is any time and can be changed. If $Ta \leq X$ (Yes at Step S423), the maintenance control unit 341 performs Maintenance D (at Step S424), and ends the process. If not (No at Step S423), the maintenance control unit 341 repeats Maintenance D n times (at Step S425), and ends the process. The number n of repeats can be set to any value. If not ($2Tk_0<Tk$) (No at Step S422), the process ends.

By performing the above-described process, the image forming apparatus 100 can more effectively exert the maintenance effect on the nozzles while reducing the power consumption when the apparatus is driven by the auxiliary power supply 4.

In this manner, the maintenance unit 333 of the present embodiment performs the control of halting the maintenance operations while the power is supplied from the auxiliary power supply 4, and performs the control of performing the maintenance operations based on the maintenance conditions (to be satisfied, at the time when the power supply source is switched to the main power supply 3 [commercial power supply], by the cumulative time Tk of the times during which the operating mode state was that of the power-saving mode St032, and by the elapsed time Ta from the time when the last image forming operation ended to the time when the power supply source was switched to the main power supply 3). By performing this control, the maintenance unit 333 stops the maintenance operations when the apparatus is driven by the auxiliary power supply 4, and thereby can reduce the power consumed for the maintenance operations, thus being able to reduce the power consumption when the apparatus is driven by the auxiliary power supply 4.

The maintenance unit 333 selects and performs an effective type of maintenance based on the maintenance conditions (to be satisfied, at the time when the power supply source is switched from the auxiliary power supply 4 to the main power supply 3, by the cumulative time Tk of the times during which the operating mode state was that of the power-saving mode St032, and by the elapsed time Ta from the time when the last image forming operation ended to the time when the power supply source was switched to the main power supply 3), and thereby can further improve the maintenance effect on the nozzles.

In other words, although the cumulative time Tk of the times during which the operating mode state was that of the power-saving mode St032 is the same as that of the second embodiment, the time increases during which the nozzles have been left unused until immediately before the maintenance as the elapsed time Ta increases from when the last print operation ended until the power supply source was switched to the main power supply 3. That is why the maintenance operations are repeated n times, whereby the nozzles can most effectively be maintained.

As described above, the present embodiment can reduce the power consumption when the apparatus is driven by the auxiliary power supply 4, and can also more effectively exert the maintenance effect on the nozzles.

Fourth Embodiment

A fourth embodiment will be described below. In the present embodiment, when performing the maintenance operations, the maintenance unit 333 performs control of performing the maintenance operations, based on the cumulative time Tk of the times during which the mode was the power-saving mode St032 between the time when the mode was switched into the power-saving mode St032 while the power was supplied from the auxiliary power supply 4 and the time when the power supply source was switched to the main power supply 3, and also on the number Y of copies on which images have been formed while the power was supplied from the auxiliary power supply 4. The specific details will be described below. Detailed description will be omitted as appropriate for parts duplicating those of the first to third embodiments described above.

Figure 13:
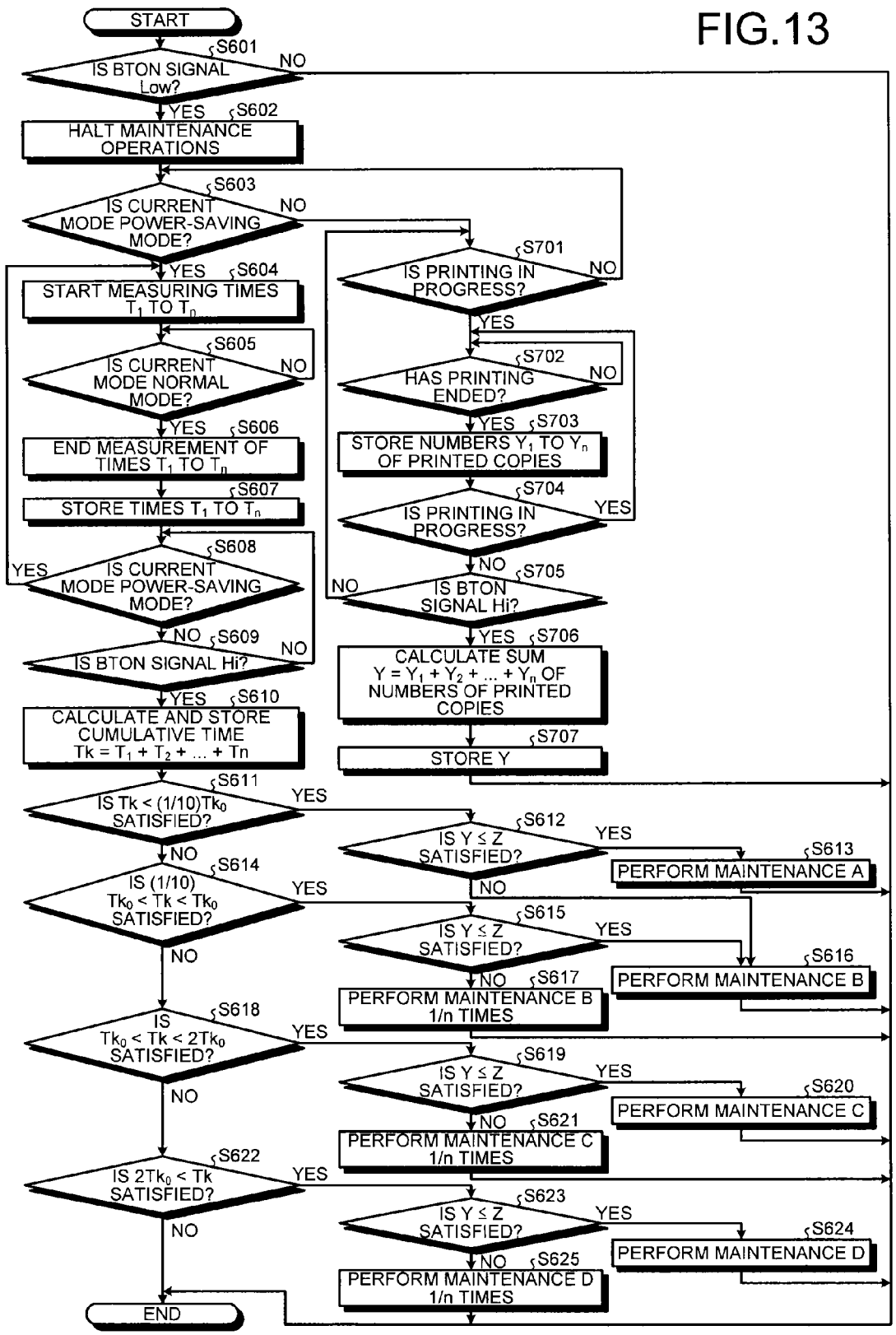
FIG. 13 is a flowchart explaining a control operation example of a maintenance unit carried out in an image forming apparatus according to a fourth embodiment the present invention.

FIG. 13 illustrates a control operation example of the maintenance unit carried out in the image forming apparatus of the present embodiment. FIG. 13 is a flowchart illustrating an example of a procedure when the maintenance unit performs the maintenance operations based on the cumulative time Tk and the number of copies on which images have been formed while the power was supplied from the auxiliary power supply.

As illustrated in FIG. 13, so as to determine whether the power supply source of the image forming apparatus 100 is the main power supply 3 or the auxiliary power supply 4, the maintenance control unit 341 of the maintenance unit 333 determines whether the BTON signal detected by the detection unit 206 is at Low level (Step S601). If not (No at Step S601), the maintenance control unit 341 determines that the power supply source is the main power supply 3, and ends the process. If the BTON signal is at Low level (Yes at Step S601), the maintenance control unit 341 determines that the power supply source is the auxiliary power supply 4, and halts the maintenance operations (Step S602).

Then, the mode monitoring unit 342 determines whether the current mode controlled by the mode control unit 332 is the power-saving mode St032 (Step S603). If not (No at Step S603), the operation monitoring unit 343 determines whether printing is in progress (Step S701). If printing is not in progress (No at Step S701), the operation monitoring unit 343 returns the process to Step S603, and repeats the determination process of whether the current mode is the power-saving mode St032. If printing is in progress (Yes at Step S701), the operation monitoring unit 343 determines whether the printing has ended (Step S702). If the printing has not ended (No at Step S702), the operation monitoring unit 343 repeats the determination of whether the printing has ended. If the printing has ended (Yes at Step S702), the operation monitoring unit 343 obtains and stores the numbers ($Y_1$ to $Y_n$) of printed copies (Step S703).

Then, the operation monitoring unit 343 determines whether printing is in progress (Step S704). If so (Yes at Step S704), the operation monitoring unit 343 returns the process to Step S702, and repeats the determination process of whether the printing has ended. If printing is not in progress (No at Step S704), the maintenance control unit 341 determines whether the BTON signal detected by the detection unit 206 is at Hi level (Step S705) so as to determine whether the power supply source of the image forming apparatus 100 is the main power supply 3 or the auxiliary power supply 4. If the BTON signal is not at Hi level (No at Step S705), the maintenance control unit 341 determines that the power supply source is not the main power supply 3, then returns the process to Step S701, and repeats the determination process of whether printing is progress. If the BTON signal is at Hi level (Yes at Step S705), the maintenance control unit 341 determines that the power supply source is the main power supply 3, and the operation monitoring unit 343 calculates the sum ($Y=Y_1+Y_2+\ldots+Y_n$) of the numbers ($Y_1$ to $Y_n$) of printed copies stored at Step S703 (Step S706), stores the total number Y of printed copies (Step S707), and ends the process.

Referring back to Step S603, if the current mode controlled by the mode control unit 332 is the power-saving mode St032 (Yes at Step S603), the mode monitoring unit 342 obtains, from the mode control unit 332, the time when the operating mode state of the image forming apparatus 100 changed to that of the power-saving mode St032, and starts measuring the elapsed times ($T_1$ to $T_n$) of the state of the power-saving mode St032 (Step S604).

Then, the mode monitoring unit 342 determines whether the current mode controlled by the mode control unit 332 is the normal mode St031 (Step S605). If not (No at Step S605), the mode monitoring unit 342 repeats the determination process of whether the current mode is the normal mode St030. If the current mode is the normal mode St031 (Yes at Step S605), the mode monitoring unit 342 obtains, from the mode control unit 332, the time when the operating mode state of the image forming apparatus 100 changed to that of the normal mode St030, then ends the measurement of the elapsed times ($T_1$ to $T_n$) of the state of the power-saving mode St032 (Step S606), and stores the elapsed times ($T_1$ to $T_n$) during which the operating mode state was that of the power-saving mode St032 (Step S607).

Then, the mode monitoring unit 342 determines whether the current mode controlled by the mode control unit 332 is the power-saving mode St032 (Step S608). If so (Yes at Step S608), the mode monitoring unit 342 returns the process to Step S604, and repeats the process of measuring the elapsed times ($T_1$ to $T_n$) during which the operating mode state was that of the power-saving mode St032. If not (No at Step S608), the maintenance control unit 341 determines whether the BTON signal detected by the detection unit 206 is at Hi level (Step S609) so as to determine whether the power supply source of the image forming apparatus 100 is the main power supply 3 or the auxiliary power supply 4. If the BTON signal is not at Hi level (No at Step S609), the maintenance control unit 341 determines that the power supply source is the auxiliary power supply 4, then returns the process to Step S608, and repeats the determination process of whether the current mode is the power-saving mode St032. If the BTON signal is at Hi level (Yes at S609), the maintenance control unit 341 determines that the power supply source is the main power supply 3, and calculates and stores the cumulative time Tk ($Tk=T_1+T_2+\ldots+T_n$) of the elapsed times ($T_1$ to $T_n$) during which the operating mode state was that of the power-saving mode St032 (Step S610).

Then, the maintenance control unit 341 determines whether the cumulative time Tk satisfies $Tk<(1/10) \times Tk_0$ (Step S611). If $Tk<(1/10) \times Tk_0$ (Yes at Step S611), the maintenance control unit 341 compares the total number Y of printed copies stored at Step S707 with a preset number Z of copies, and determines whether $Y \leq Z$ (Step S612). The preset number Z of copies has any value and can be changed. If $Y \leq Z$ (Yes at Step S612), the maintenance control unit 341 performs Maintenance A (Step S613), and ends the process. If not (No at Step S612), the maintenance control unit 341 ends the process.

If not [$Tk<(1/10) \times Tk_0$] (No at Step S611), the maintenance control unit 341 determines whether the cumulative time Tk satisfies $(1/10) \times Tk_0 < Tk < Tk_0$ (Step S614). If $(1/10) \times Tk_0 < Tk < Tk_0$ (Yes at Step S614), the maintenance control unit 341 compares the total number Y of printed copies stored at Step S707 with the preset number Z of copies and determines whether Y≤Z (Step S615). The preset number Z of copies has any value and can be changed. If Y≤Z (Yes at Step S615), the maintenance control unit 341 performs Maintenance B (Step S616), and ends the process. If not (No at Step S615), the maintenance control unit 341 repeats Maintenance B 1/n times (Step S617), and ends the process. The number n of repeats can be set to any value.

If not [(1/10)×$Tk_0$<Tk<$Tk_0$] (No at Step S614), the maintenance control unit 341 determines whether the cumulative time Tk satisfies $Tk_0$<Tk<$2Tk_0$ (Step S618). If $Tk_0$<Tk<$2Tk_0$ (Yes at Step S618), the maintenance control unit 341 compares the total number Y of printed copies stored at Step S707 with the preset number Z of copies, and determines whether Y≤Z (Step S619). The preset number Z of copies has any value and can be changed. If Y≤Z (Yes at Step S619), the maintenance control unit 341 performs Maintenance C (Step S620), and ends the process. If not (No at Step S619), the maintenance control unit 341 repeats Maintenance C 1/n times (Step S621), and ends the process. The number n of repeats can be set to any value.

If not ($Tk_0$<Tk<$2Tk_0$) (No at Step S618), the maintenance control unit 341 determines whether the cumulative time Tk satisfies $2Tk_0$<Tk (Step S622). If $2Tk_0$<Tk (Yes at Step S622), the maintenance control unit 341 compares the total number Y of printed copies stored at Step S707 with the preset number Z of copies, and determines whether Y≤Z (Step S623). The preset number Z of copies has any value and can be changed. If Y≤Z (Yes at Step S623), the maintenance control unit 341 performs Maintenance D (Step S624), and ends the process. If not (No at Step S623), the maintenance control unit 341 repeats Maintenance D 1/n times (Step S625), and ends the process. The number n of repeats can be set to any value. If not ($2Tk_0$<Tk) (No at Step S622), the maintenance control unit 341 ends the process.

By performing the above-described process, the image forming apparatus 100 can more effectively exert the maintenance effect on the nozzles while reducing the power consumption when the apparatus is driven by the auxiliary power supply 4.

In this manner, in the present embodiment, the maintenance unit 333 performs the control of halting the maintenance operations while the power is supplied from the auxiliary power supply 4, and when the power supply source has been switched to the main power supply 3 (the commercial power supply), performs the control of performing the maintenance operations based on the cumulative time Tk of the times during which the operating mode state was that of the power-saving mode St032, and also number Y of copies on which images have been formed while the power was supplied from the auxiliary power supply 4. By performing this control, the maintenance unit 333 stops the maintenance operations when the apparatus is driven by the auxiliary power supply 4, and thereby can reduce the power consumed for the maintenance operations, thus being able to reduce the power consumption when the apparatus is driven by the auxiliary power supply 4.

When the power supply source has been switched from the auxiliary power supply 4 to the main power supply 3, the maintenance unit 333 selects and performs an effective type of maintenance based on the cumulative time Tk of the times during which the operating mode state was that of the power-saving mode St032, and also on the number Y of copies on which images have been formed while the power was supplied from the auxiliary power supply 4, whereby the maintenance effect on the nozzles can further be improved.

This means that, although the cumulative time Tk of the times during which the operating mode state was that of the power-saving mode St032 is the same as that of the second embodiment, more ink circulates into the print head 13 as the number of copies increases on which images have been formed while the power was supplied from the auxiliary power supply 4. This allows the maintenance effect to be exerted with a smaller number or shorter time of the maintenance operations, and thereby can most effectively maintain the nozzles.

As described above, the present embodiment can reduce the power consumption when the apparatus is driven by the auxiliary power supply 4, and can also more effectively exert the maintenance effect on the nozzles.

As has been described above, according to the present embodiment, when the apparatus is driven by the auxiliary power supply 4, the maintenance unit 333 automatically sets the power-saving mode St032 switching time T to the switching time T shorter than the switching time $T_0$ set in advance. This causes the mode to be switched into the power-saving mode allowing the lowest power consumption in a shorter time without manual resetting of the switching time T by the user when the apparatus is driven by the auxiliary power supply 4. This can, in turn, reduce the power consumption when the apparatus is driven by the auxiliary power supply 4, and thereby can extend the duration of the auxiliary power supply 4.

The maintenance unit 333 performs the control of halting the maintenance operations when the apparatus is driven by the auxiliary power supply 4, and performs the control of performing the various maintenance operations when the apparatus has been switched to be driven by the main power supply 3 (the commercial power supply). As a result, the maintenance unit 333 stops the maintenance operations when the apparatus is driven by the auxiliary power supply 4, and thereby can reduce the power consumed for the maintenance operations, thus being able to reduce the power consumption when the apparatus is driven by the auxiliary power supply 4.

Based on the maintenance conditions (to be satisfied by any one or more of the cumulative time Tk of the times during which the operating mode state was that of the power-saving mode St032, the elapsed time Ta from the time when the last image forming operation ended to the time when the power supply source was switched to the main power supply 3, and the number Y of copies on which images have been formed while the power was supplied from the auxiliary power supply), the maintenance unit 333 selects the most effective type and number of times of the maintenance operations to be performed when the apparatus is switched to be driven by the main power supply 3, whereby the maintenance effect on the nozzles can further be improved.

The control program that implements the mode control unit 332 and the maintenance unit 333 of either of the embodiments may be provided by being recorded as a file in an installable format or an executable format in a computer-readable storage medium, such as a CD-ROM, a flexible disk (FD), a CD-R, or a digital versatile disc (DVD).

The control program that implements the mode control unit 332 and the maintenance unit 333 of either of the embodiments may also be provided by being stored on a computer connected to a network such as the Internet, and downloaded via the network. The control program that implements the mode control unit 332 and the maintenance unit 333 of either of the embodiments may also be provided or delivered via a network such as the Internet.

According to the embodiments, it is possible to reduce the power consumption when an image forming apparatus is driven by an auxiliary power supply.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An output apparatus comprising:
a main power supply;
an auxiliary power supply that stores therein power from the main power supply, and supplies the stored power;
a power supply control unit that performs control of switching a power supply source to the auxiliary power supply when the main power supply is off, and control of switching the power supply source to the main power supply when the main power supply is on;
a detection unit that detects whether the power supply source is the main power supply or the auxiliary power supply;
a mode control unit that performs control of switching between a normal mode and a power-saving mode in which power consumption is smaller than in the normal mode; and
a maintenance unit that performs a maintenance on an output unit, wherein
the mode control unit performs control of setting a switching time to switch from the normal mode to the power-saving mode to a shorter time when the detection unit detects that the power supply source is the auxiliary power supply,
the maintenance unit halts an operation of the maintenance when the detection unit detects that the power supply source is the auxiliary power supply, and
the maintenance unit performs the operation of the maintenance when the power supply source is switched from the auxiliary power supply to the main power supply.

2. The output apparatus according to claim 1, wherein the maintenance unit performs the operation of the maintenance based on a cumulative time of times during the power-saving mode from a time when the output apparatus is switched into the power-saving mode while being supplied with power from the auxiliary power supply to a time when the power supply source is switched to the main power supply.

3. The output apparatus according to claim 2, wherein the maintenance unit performs the operation of the maintenance based on the cumulative time and an elapsed time from a time when an output operation last ends while the output apparatus is supplied with power from the auxiliary power supply to a time when the power supply source is switched to the main power supply.

4. The output apparatus according to claim 2, wherein the maintenance unit performs the operation of the maintenance based on the cumulative time and a number of copies on which images have been formed while the output apparatus is supplied with power from the auxiliary power supply.

5. A power supply control method performed in an output apparatus that includes a main power supply, and an auxiliary power supply that stores therein power from the main power supply, and supplies the stored power, the method comprising:
performing power supply control of switching a power supply source to the auxiliary power supply when the main power supply is off, and of switching the power supply source to the main power supply when the main power supply is on;
detecting whether the power supply source is the main power supply or the auxiliary power supply;
performing mode control of setting a switching time to switch from a normal mode to a power-saving mode in which power consumption is smaller than in the normal mode;
performing a maintenance on an output unit,
wherein performing the control of setting the switching time to switch from the normal mode to the power-saving mode to a shorter time when it is detected that the power supply source is the auxiliary power supply,
wherein an operation of the maintenance is halted when it is detected that the power supply source is the auxiliary power supply, and
wherein the operation of the maintenance is performed when the power supply source is switched from the auxiliary power supply to the main power supply.

* * * * *